United States Patent [19]
Kawagoe et al.

[11] Patent Number: 5,712,563
[45] Date of Patent: Jan. 27, 1998

[54] STEERING TORQUE SENSOR UTILIZING A DISPLACEMENT DETECTOR HAVING A PULSE POWER SUPPLY

[75] Inventors: Hiroyuki Kawagoe; Akira Ozawa; Susumu Ohta; Junichi Yoshida, all of Wako, Japan

[73] Assignee: Honda Giken Kogyo Kabushiki Kaisha, Tokyo, Japan

[21] Appl. No.: 458,280

[22] Filed: Jun. 2, 1995

[30] Foreign Application Priority Data

Jun. 13, 1994 [JP] Japan .................... 6-130363
Jun. 13, 1994 [JP] Japan .................... 6-130539

[51] Int. Cl.⁶ .................................... G01B 7/14
[52] U.S. Cl. .................... 324/207.19; 324/207.16; 324/654; 340/870.31; 73/862.331; 318/653; 318/656
[58] Field of Search .................... 324/207.12, 207.15, 324/207.16, 207.17, 207.19, 207.26, 654, 656, 657; 73/862.325, 862.331, 862.332, 862.69; 340/870.31, 870.35, 870.36, 941; 318/653, 656, 657, 660

[56] References Cited

U.S. PATENT DOCUMENTS

| | | | |
|---|---|---|---|
| 4,364,045 | 12/1982 | Spiegel | 340/870.31 |
| 4,626,621 | 12/1986 | Hiyama et al. | 178/18 |
| 4,649,341 | 3/1987 | Ulbrich et al. | 324/654 |
| 4,859,942 | 8/1989 | Charton et al. | 324/654 |
| 5,148,107 | 9/1992 | Finger et al. | 324/654 |
| 5,198,764 | 3/1993 | Spencer | 324/654 |
| 5,332,966 | 7/1994 | Berberich | 324/656 |
| 5,481,187 | 1/1996 | Marcott et al. | 324/654 |

FOREIGN PATENT DOCUMENTS 2 005 844  4/1979  United Kingdom.

*Primary Examiner*—Sandra L. O'Shea
*Assistant Examiner*—Jay M. Patidar
*Attorney, Agent, or Firm*—Armstrong, Westerman, McLeLand and Naughton

[57] ABSTRACT

A displacement detector for enabling a precise detection of a displaced quantity of the core. The displacement detector is provided with a displaceable core, a detecting coil the inductance of which varies in response to a displaced quantity and a reference resistor, wherein a transient response voltage in case of a pulse voltage being applied to the inductance and the reference resistor is detected to enable detection of the absolute value of the inductance and thereby the change in the inductance which corresponds to the displaced quantity is detected independently of the peak value or the frequency of the pulse voltage. The displacement detector is preferably used in a torque sensor for an electric powered steering system, wherein the core of the displacement detector is formed of nonmagnetic metal material, the structure is simple, and a sensitive detection of a displaced quantity of the steering torque is possible.

16 Claims, 13 Drawing Sheets

$$V_O = V_I * e - \frac{R_F}{L} * t$$

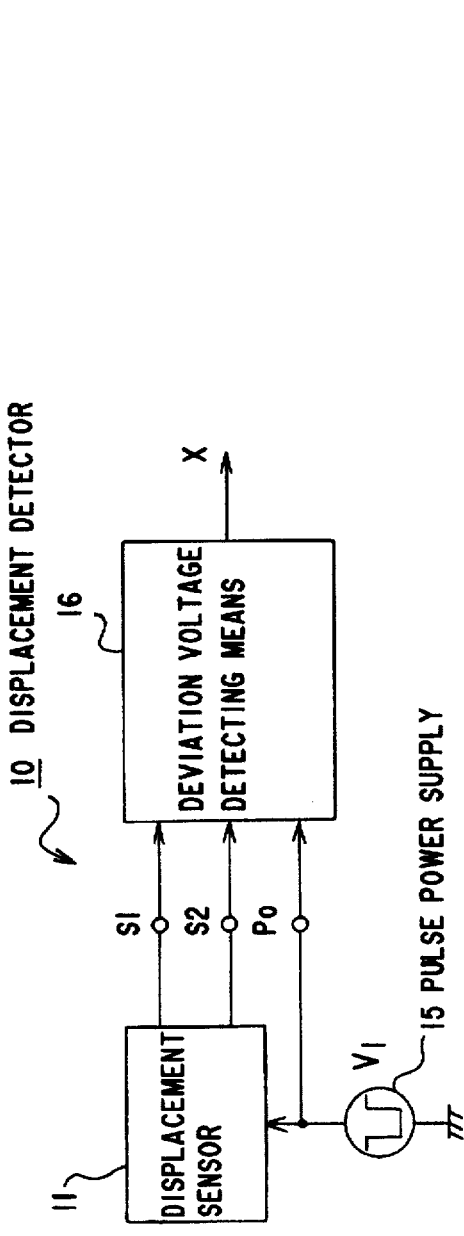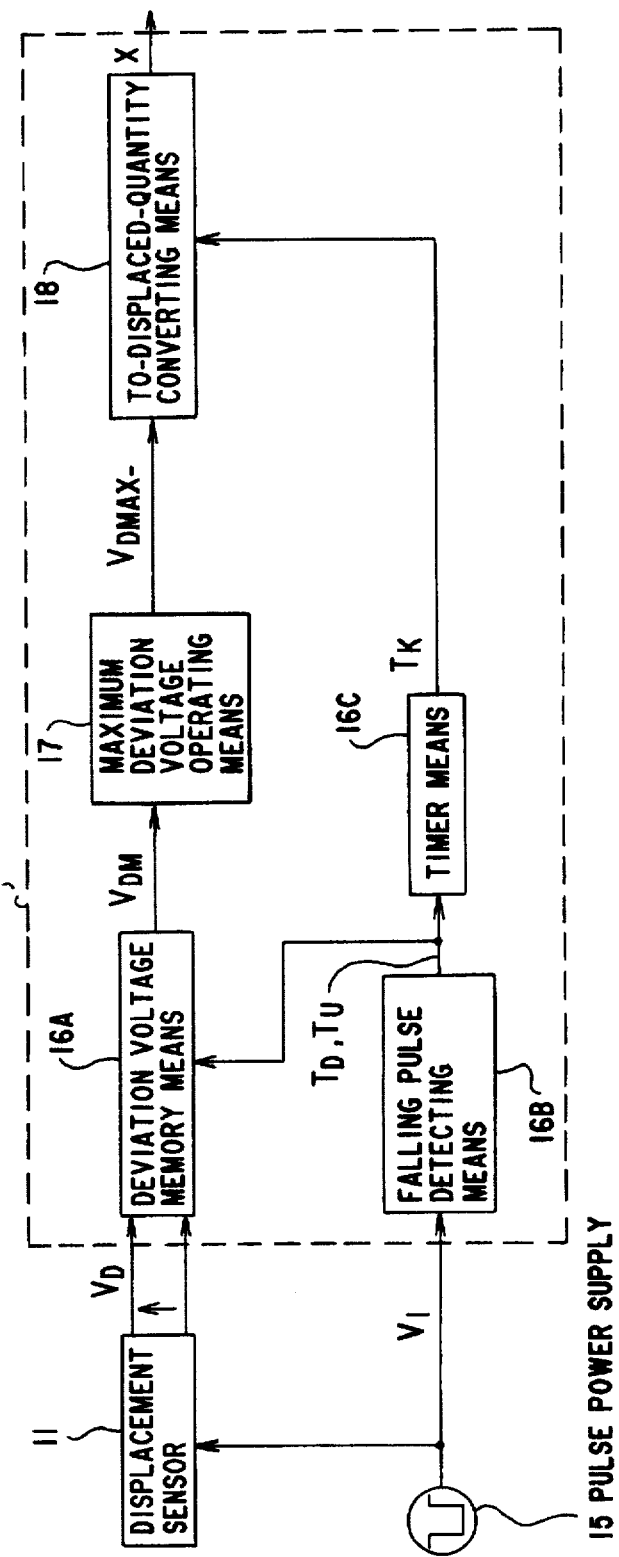
Fig.9
Fig.10

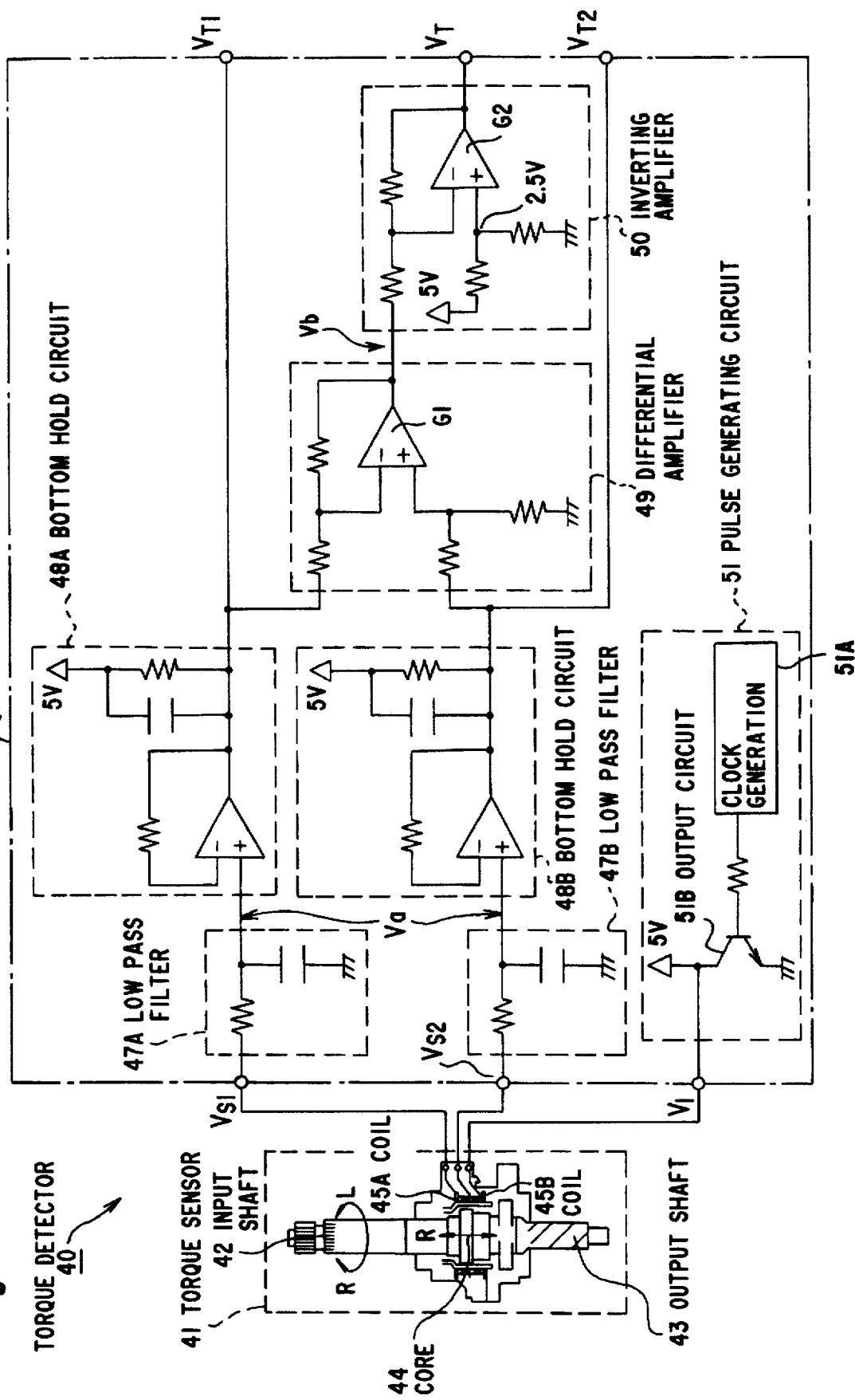

$L1 = L2$ $S1 = S2$ $L1 > L2$ $S1 < S2$

STEERING TORQUE SENSOR UTILIZING A DISPLACEMENT DETECTOR HAVING A PULSE POWER SUPPLY

BACKGROUND OF THE INVENTION a. Field of the Invention

The present invention relates to a displacement detector for detecting a displacement on the basis of a change in the inductance of a detecting coil and a steering torque sensor utilizing the displacement detector. More particularly, a change in the inductance is detected as a transient response voltage.

b. Description of the Related Art

Well-known conventional displacement detectors detect a displacement by converting a change in the impedance of a detecting coil into an electrical signal.

Conventional displacement detectors are so arranged that a displacement is detected by detecting a level of the response signal in the case of a signal (e.g., a sine-wave signal) being applied from the outside to a detecting coil the core of which moves in response to a displacement of the target to cause the impedance (the inductance) of the coil to change.

FIG. 17 shows an arrangement of a main part of a conventional displacement detector, while FIG. 18 shows an equivalent circuit of the detector.

As shown in FIG. 17, a prior art displacement detector 91 comprises a displacement sensor provided with a core 93 subjected to a displacement (displaced quantity x1, x2) and two detecting coils 92A and 92B which are symmetrical in the displacement direction and disposed so as to encircle the core 93, an AC power supply $V_s$ connected to between the ground GND and a node where each one end of the detecting coils 92A and 92B are connected together, and two reference resistors "rf" connected to between the ground GND and each of the other ends (terminals D1 and D2) of the coils 92A and 92B.

The arranged conventional displacement detector 91 shown in FIG. 17 can be represented by an equivalent circuit or a bridge circuit having inductances L1 and L2 and two reference resistors rf, one along each side of the bridge as shown in FIG. 18.

In FIG. 18, the inductances L1 and L2 indicate the ones of the detecting coils 92A and 92B which have resulted from, for example, a displacement x1 of the core 93. The arrangement is such that the inductances L1 and L2 have equal values (L1=L2) when the core 93 is at the neutral position.

When an AC voltage (e.g., a sine wave with a peak value of $V_f$ and a frequency of "f") is applied to the equivalent circuit of FIG. 18, output voltages $V_{O1}$ and $V_{O2}$ from the output terminal D1 and D2 are detected in response to a change in the impedance. The output voltages are represented by the following expressions:

$$V_{O1} = rf \ast V_f / \{(rf)^2 + (2\pi f \ast L1)^2\}^{1/2} \qquad \text{[Formula 1]}$$

$$V_{O2} = rf \ast V_f / \{(rf)^2 + (2\pi f \ast L2)^2\}^{1/2}.$$

Thus, the resultant detection output $V_O$ responsive to the displacement (x1, x2) of the core 93 is calculated from the deviation of $V_{O1}$ and $V_{O2}$, that is, $V_{O1}-V_{O2}$.

The inductances L1 and L2 would cancel each other (L1=L2) without any displacement of the core 93 (with the core 93 neutrally positioned), and accordingly the corresponding impedances would also equal each other to yield a detection output $V_O$ of zero.

As described above, in a conventional displacement detector 91, a displacement of the core 93 of the displacement sensor, responsive to a displacement of the target causes the inductances L1 and L2 of the detecting coils 92A and 92B to change and accordingly the impedance to change, so that the displaced quantity of the target can be detected by detecting a deviation $V_O$ between the voltages $V_{O1}$ and $V_{O2}$.

However, there remains a problem, in the prior art displacement detector 91, that changes in the impedances of the detecting coils 92A and 92B can not be effectively detected because the detection utilizes the changes in the impedances caused by a change in the magnetic flux which occurs with a displacement (x1, x2) of the core 93.

The impedance (Z) of the detecting coils 92A and 92B in case of the core 93 being at the neutral position is represented by the following expression:

$$|Z| = \{r^2 + (2\pi f \ast L)^2\}^{1/2}, \qquad \text{[Formula 2]}$$

where L is the inductances of the detecting coils 92A and 92B, "r" is the internal resistance, and "f" is the frequency of the AC power supply.

As is apparent from the expression (2), the impedance equals the vector sum of the internal resistance r and the reactance $2\pi f \ast L$ and in order to detect a variation $\Delta L$ of the inductance L with a high precision, it is necessary to reduce the internal resistance "r" and the frequency "f" of the AC power supply voltage $V_s$.

However, once the wire is wound to form the detecting coils 92A and 92B, the internal resistance "r" increases.

Further, raising the frequency "f" is necessary to provide a detection output by magnetizing the bridge circuit, whereas a higher frequency "f" will cause the core loss to increase the resistance "r".

Thus, in a conventional displacement detector using a bridge circuit, a sensitive detection of a displaced quantity is disadvantageously impossible because a change in the impedance caused by a magnetic flux variation can not be precisely detected.

Also, a steering torque sensor utilizing the above described displacement detector and intended for a electric powered steering system is well known.

FIG. 19 depicts a structure of a conventional steering torque sensor.

In the steering torque sensor 100 shown in FIG. 19, an input shaft 101 and output shaft 102 are internally linked together via a torsion bar 103, two detecting coils 105 and 106 supported by a housing 104 is provided and disposed so as to encircle a cylindrical core 107 engaging with the input and output shaft 101 and 102.

The displacement detector 110 is composed of the two coils 105 and 106 and the core 107 as primary elements.

When a torsional torque is applied to the input shaft 101, the torsion bar 103 elastically deforms causing a relative displacement in the rotational direction between the input and output shaft 101 and 102.

Also, the core 107 provided around the input and output shaft 101 and 102 is so arranged as to be only movable in the axial direction, by a longitudinal guide groove of the output shaft 102 engaging with a part inwardly projected from the core 107.

Further, a slider pin 109 pressed in the input shaft 101 engages with a spiral groove 108 of the core 107.

In the above-mentioned arrangement, a displacement in the rotational direction between the input 101 and output 102 shafts is converted into a longitudinal displacement of the core 107, which causes a change in the magnetic flux around the detecting coils 105 and 106, resulting in a change in the inductance L (L1, L2) of the detecting coils 105 and 106 disposed upward and downward along the input and output shaft.

The core 107 is constructed by inserting each of both ends of the cylindrical core 107A formed of a cylindrical magnetic material (SCM) into an aluminum ring 107B called a leak cut ring.

If the core 107 moves towards the input shaft 101 in response to a displacement of the target, the inductance L1 of the detecting coil 105 which the core 107 approaches increases and the inductance L2 of the detecting coil 106 which the core 107 goes away from decreases. These changes in the inductance are electrically derived to detect the steering torque.

However, there remains a problem in a conventional steering torque sensor that the structure is complicated because the core 107 of the displacement detector 110 comprises a core 107A of SCM material and two aluminum rings 107B.

If, in view of this, the core 107 is constructed only with an SCM core 107A, though the structure is simplified, the magnetic flux leaks to other magnetic substances than the core 107A to decrease in change responsive to a displacement of the core 107A. This, in turn, makes small a change in the inductance L (L1, L2) resulting in a less sensitivity of the displacement detection. This is another problem.

Further, there is still another problem that the sensor characteristic varies from sensor to sensor because magnetic distortion occurs in machining when a magnetic metal material made of SCM material is formed into a core 107A.

SUMMARY OF THE INVENTION

It is an object of the invention to provided a displacement detector for detecting a displacement on the basis of a change in the inductance of a detecting coil. The displacement detector comprises a displaceable core, a detecting coil the inductance of which varies in response to a displaced quantity of the core and a reference resistor, and enables a precise detection of a displaced quantity of the core by detecting a transient response voltage in case of a pulse voltage being applied to the inductance and the reference resistor to enable detection of the absolute value of the inductance and thereby detecting the change in the inductance which corresponds to the displaced quantity, independently of the peak value or the frequency of the pulse voltage.

It is another object of the invention to provide a displacement detector provided with a displaceable core, two detecting coils the inductances of which vary in response to a displaced quantity, two reference resistors and deviation voltage detecting means, the two detecting coils and the two reference resistors forming a bridge circuit, wherein: a pulse power supply is applied to the bridge circuit to detect a transient response voltage output from the bridge circuit; and a differential changes in the inductances, corresponding to a displaced quantity of the core is detected by detecting a deviation voltage of the transient response voltage by means of the deviation voltage detecting means, so that the displaced quantity of the core can be detected with a high precision.

It is further object of the invention to provide a displacement detector provided with deviation voltage detecting means comprising maximum deviation voltage operating means for detecting the maximum value of the deviations of transient response voltages and to-displaced-quantity converting means for converting the maximum deviation voltage from the maximum deviation voltage operating means into a displaced quantity, wherein the displaced quantity of the core can be detected with a high precision because a displacement length is detected as a large voltage.

It is still another object of the invention to provide a displacement detector provided with deviation voltage detecting means comprising falling maximum deviation voltage detecting means, rising maximum deviation voltage detecting means, deviation output means and to-displaced-quantity converting means, wherein: the maximum value of deviations between the two path transient response voltages during each pulse period of a falling and a rising pulse is detected; the deviation of the maximum value for each pulse period is detected and converted into a displaced quantity; the displaced quantity is detected as a larger voltage, so that the displaced quantity of the core can be detected with a higher precision.

It is yet another object of the invention to provide a steering torque sensor for an electric powered steering system, which simplifies the structure because the core of the displacement detector is formed of a single component of nonmagnetic metal material and which can precisely detect a displaced quantity of the steering torque.

It is still further object of the invention to provide a steering torque sensor for an electric powered steering system, wherein it is possible to reduce a variation in the characteristic of the sensor, involved in machining when a magnetic metal material is formed into the core because the core of the displacement detector is formed of a single component of nonmagnetic metal material.

As described above, according to an aspect of the present invention there is realized a displacement detector which can precisely and sensitively detect a displaced quantity of the target because by applying a pulse power supply to a circuit in which the inductance of a detecting coil and a reference resistor is serially connected, the absolute value of the inductance is detected regardless of the peak value or the frequency of the pulse power supply.

Also, according to another aspect of the invention, there is realized a torque sensor for a electric powered steering system, which is simply constituted and yet enables a sensitive detection of the displaced quantity caused by a steering torque.

BRIEF DESCRIPTION OF THE DRAWINGS

FIG. 9 is a block diagram showing the overall structure of an exemplary displacement detector according to the present invention, including deviation voltage detecting means;

FIG. 10 is a block diagram of a primary part structure of a first illustrative embodiment of a deviation voltage detecting means for a displacement detector according to the invention;

FIG. 13 is a block diagram of a primary part structure of a torque detector using a displacement detector according to the invention;

DETAILED DESCRIPTION OF THE PREFERRED EMBODIMENTS

Referring to the appending drawings, we discuss preferred embodiments of the present invention in the following.

Figure 1:
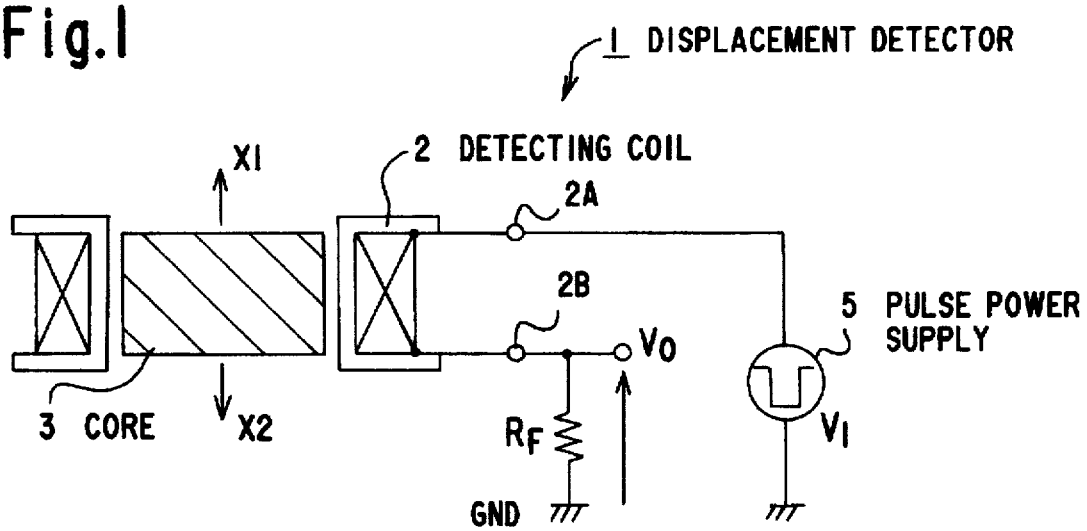
FIG. 1 is a diagram of a basic structure of a first illustrative embodiment of a displacement detector according to the invention.
Figure 2:
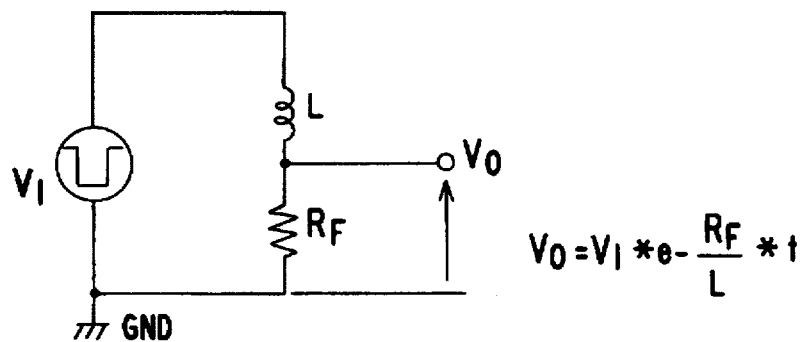
FIG. 2 is an equivalent circuit diagram of the displacement detector shown in FIG. 1.
Figure 3:
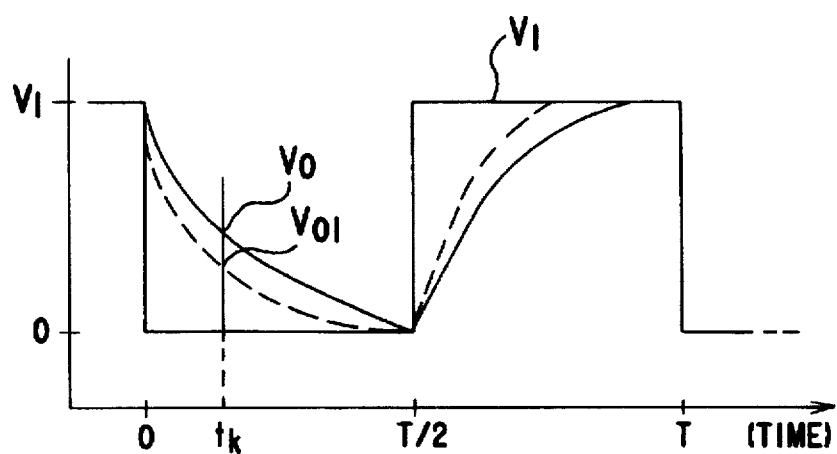
FIG. 3 is a diagram showing a wave-form of an exemplary transient response voltage of the equivalent circuit of FIG. 2.

FIG. 1 is a diagram of a basic structure of a first illustrative embodiment of a displacement detector according to the invention, FIG. 2 is an equivalent circuit diagram of the displacement detector shown in FIG. 1, and FIG. 3 shows a wave-form of an exemplary transient response voltage of the equivalent circuit of FIG. 2.

In FIG. 1, a displacement detector 1 is provided with a detecting coil 2 and a core 3, formed of nonmagnetic substance and disposed within the detecting coil 2, for undergoing a displacement (X1, X2) responsive to a displacement of the target (not shown). One end 2A of the detecting coil 2 is connected to a pulse power supply 5, and the other end 2B of the detecting coil 2 is connected to a reference resistor $R_F$. A transient response voltage $V_O$ is detected from both end of the resistor $R_F$, (the end 2B and the ground GND).

Assuming the inductance of the detecting coil 2 in case of the core 3 being at the neutral position to be L and the reference resistance $R_F$ to be sufficiently larger than the internal resistance "r" of the detecting coil, the internal resistance "r" can be ignored, yielding a equivalent circuit (LR integral circuit) of FIG. 2.

If the circuit shown in FIG. 2 is driven by a falling pulse voltage of the pulse power supply (peak values $V_I$) whose wave-form has a period a half of which (T/2) is sufficiently larger than time constant τ (=L/$R_F$), then the transient response voltage $V_O$ at a time $t_K$ is represented by the following expression:

$$V_O = V_I \cdot e^{-(R_F/L)t_K} \quad \text{[Formula 3]}$$

On the other hand, if the falling pulse of the pulse power supply (peak values $V_I$) is applied when a displacement X1 of the core 3 has caused the inductance of the detection coil 2 to decrease by ΔL to become (L−Δ), then the transient response voltage $V_{01}$ at a time $t_K$ is represented by the following expression:

$$V_{01} = V_I \cdot e^{-\{R_F/(L-\Delta L)\}t_K} \quad \text{[Formula 4]}$$

Once the inductance L has been calculated from the transient response voltage $V_O$ (expression (3)) in the state of the core 3 being at the neutral position (i.e., the displacement=0) and stored, the inductance (L−ΔL) is calculated from the transient response voltage $V_{01}$ (expression (4)) in the state of the core 3 having been displaced by X1, and then by calculating the deviation, the changed amount ΔL of the inductance L corresponding to the changed amount X1 of the core 3 can be represented by the following expression:

$$\Delta L = R_F \cdot t_K \{ \ln^{-1}(V_{01}/V_1) - \ln^{-1}(V_O/V_1) \} \quad \text{[Formula 5]}$$

As is seen from the expression (5), assuming the time $t_K$ to be constant, the changed amount ΔL of the inductance L corresponding to the changed amount X1 of the core 3 has a value responsive to ratios between the transient response voltages $V_O$ and $V_{01}$, and the peak value $V_1$.

Thus, the changed amount ΔL of the inductance L can be detected as a value independent of the peak value $V_I$ and the frequency f=(1/T) of the pulse power supply 5, and so can the changed amount X1.

Also, since the changed amount ΔL of the inductance L corresponds to the transient response voltages $V_O$ and $V_{01}$, the changed amount X1 can be detected by detecting the transient response voltages $V_O$ and $V_1$.

Note that while the above described embodiment used a falling pulse of the pulse power supply 5 for driving, the changed amount X1 can be similarly detected by detecting the transient response voltages corresponding to $V_O$ and $V_{01}$ if a rising pulse of the pulse power supply 5 is used for driving.

As described above, a displacement detector according to one aspect of the invention can detect displaced quantity on the basis of a transient response voltage of a pulse-driven LR integral circuit comprising the inductance of a detecting coil and a reference resistance.

Figure 4:
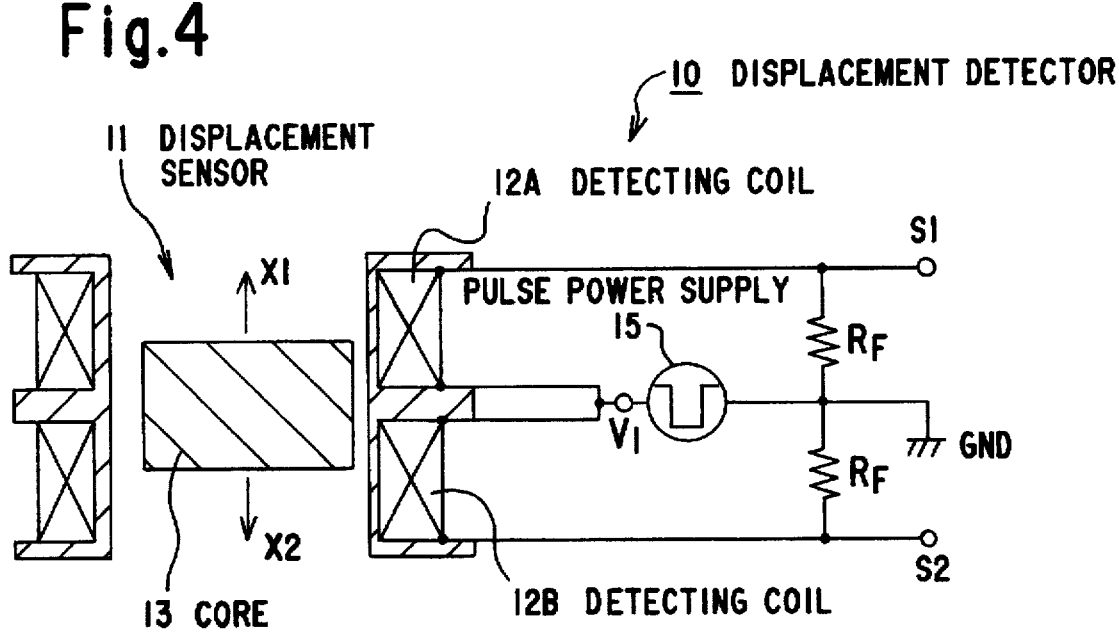
FIG. 4 is a diagram of a basic structure of a second illustrative embodiment of a displacement detector according to the invention.
Figure 5:
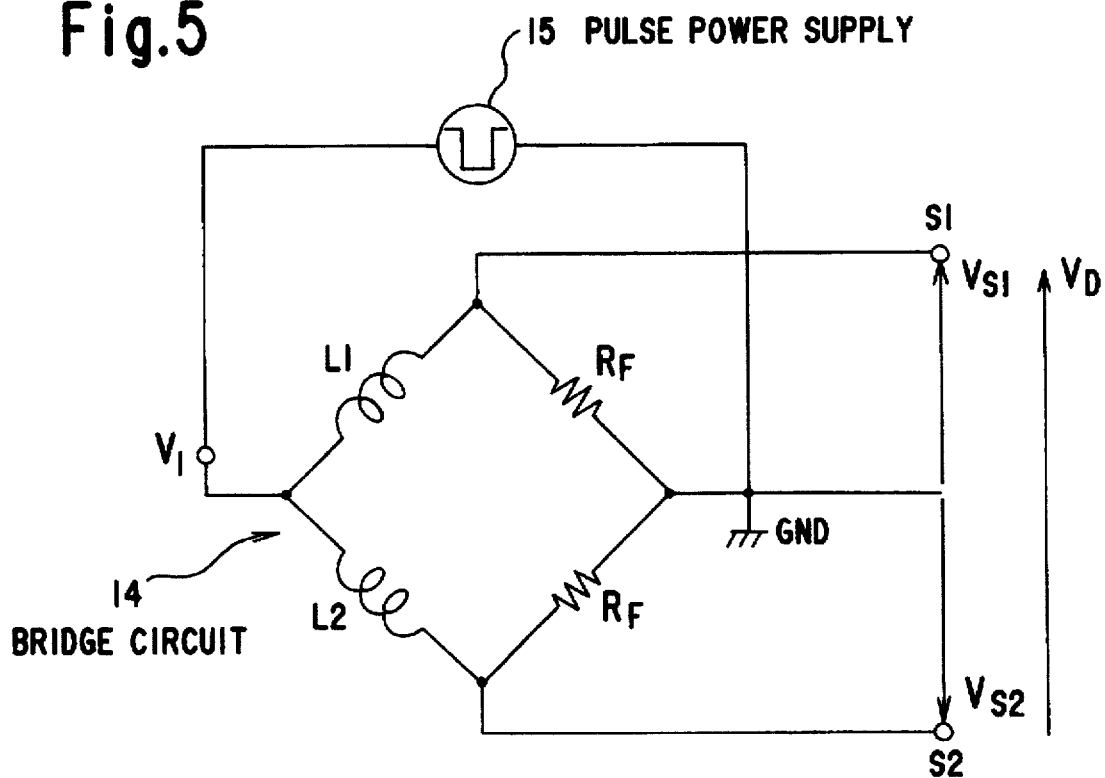
FIG. 5 is a diagram showing a bridge circuit comprising detecting coils and reference resistors.

FIG. 4 shows a basic structure of a second illustrative embodiment of a displacement detector according to the present invention, while FIG. 5 shows a bridge circuit comprising a detecting coil and a reference resistor.

In FIG. 4, a displacement sensor 11 is provided with a core 13 formed of nonmagnetic substance for being subject to a displacement in the longitudinal directions from the neutral and detecting coils 12A and 12B, which are disposed symmetrically in the directions of core 13 displacements and whose inductances differentially varies in response to a displacement of the core 13. One ends of the detecting coils 12A and 12B are connected together, and the other ends of the detecting coils 12A and 12B are respectively connected to one ends of two resistors $R_F$, the other ends which are connected to the ground GND. Thus, the displacement sensor 11 constitutes an equivalent circuit or a bridge circuit 14 shown in FIG. 5.

Also, a pulse power supply 15 (peak values $V_1$) is supplied between a node which the detecting coils 12A and 12B are connected and a node to which the two reference resistors $R_F$ are connected, while a node to which the detecting coil 12A and one of the resistors $R_F$ are connected and a node to which the detecting coil 12B and the other one of the reference resistors $R_F$ are connected are made detection terminals S1 and S2, respectively, for providing output.

In the equivalent circuit shown in FIG. 5, in which the inductances of the detecting coils 12A and 12B are assumed to be L1 and L2 respectively, the circuit between the driving nodes to which the pulse power supply 15 is applied, constitutes two LR integral circuits, the detected voltages $V_{S1}$ and $V_{S2}$ of which are derived from the terminals S1 and S2 respectively. The detected voltages $V_{S1}$ and $V_{S2}$ are the transient response voltages with respect to the peak value $V_I$.

Also, the detected voltage $V_D$ across the detection terminals S1 and S2 is a deviation $(V_{S1}-V_{S2})$.

Figure 6:
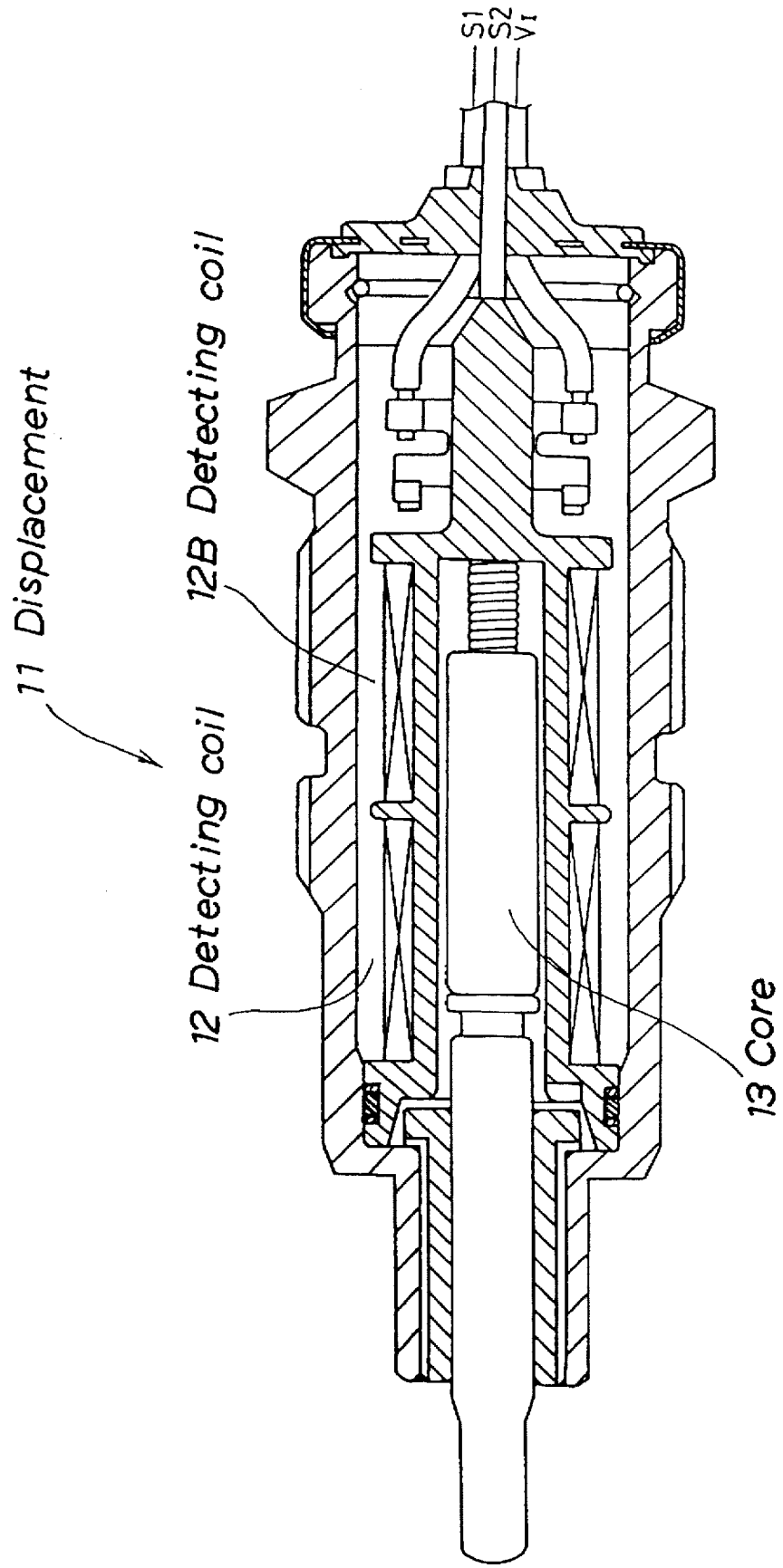
FIG. 6 is a diagram showing a structure of an illustrative embodiment of a displacement sensor of a displacement detector according to the invention.

FIG. 6 shows a structure of an illustrative embodiment of a displacement sensor for a displacement detector according to the present invention.

In FIG. 6, the displacement sensor 11 is placed in a cylindrical case and comprises a core 13 movable in the longitudinal direction of the cylindrical case, two detecting coils 12A and 12B disposed symmetrically in the direction of core 13 movements so as to surround the core 13, and the case in which the detecting coils 12A and 12B and the core 13 are contained.

The displacement sensor 11 is also provided with a wire $(V_I)$ for feeding the pulse power supply 15 from the outside to the detecting coils 12A and 12B shown in FIG. 4, and wires (S1 and S2) which connect the detecting coils 12A and 12B with the reference resistors $(R_F)$ outside the case and from which the detected voltages $(V_{S1}$ and $V_{S2})$ are derived.

When a movement of the target displaces a projected member linked with the core 13 to subject the core 13 to a displacement, the inductances of the detecting coils 12A and 12B (L1=L2=L, when the core is at the neutral position), change and accordingly a differentially detected voltage $(V_D=V_{S1}-V_{S2})$ which corresponds to the displacement of the core 13 is detected from the wires S1 and S2.

It is noted that the ground terminals GND may be grounded through the case, or may be derived outside the case by providing a wire as is done with the detecting terminals S1 and S2.

Figure 7:
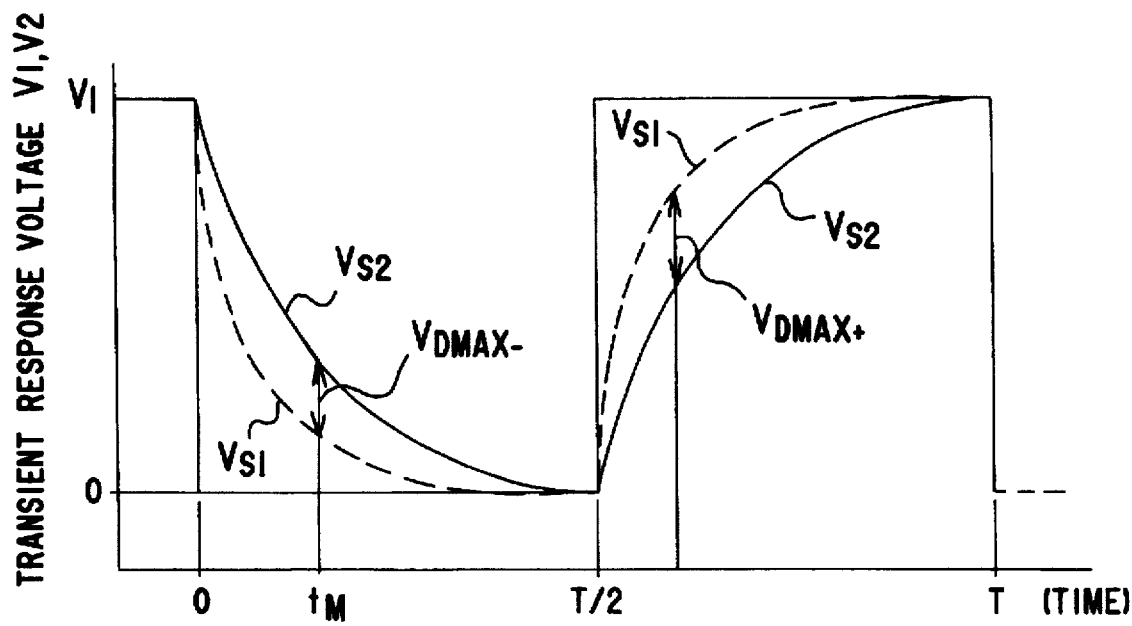
FIG. 7 is a diagram showing transient response voltage wave-forms in case when the duty cycles of the falling and rising wave-forms of FIG. 5 are equal to each other.
Figure 8:
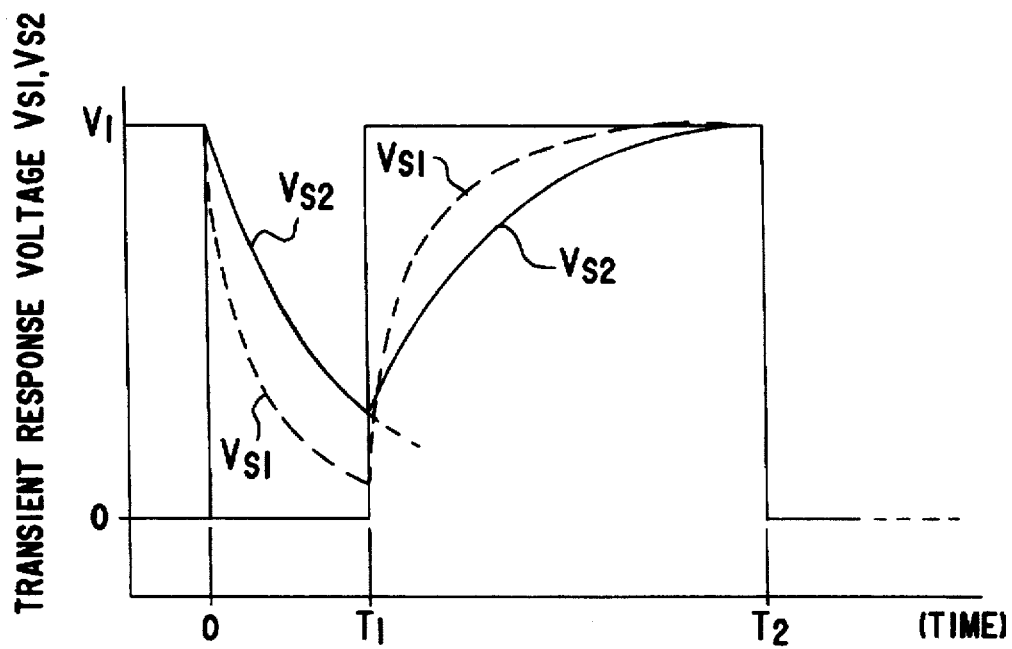
FIG. 8 is a diagram showing transient response voltage wave-forms in case when the duty cycles of the falling and rising wave-forms of FIG. 5 are different.

FIG. 7 shows transient response voltage wave-forms in case when the duty cycles of the falling and rising wave-forms of FIG. 5 are equal to each other. FIG. 8 shows transient response voltage wave-forms in case when the duty cycles of the falling and rising wave-forms of FIG. 5 are different.

Note that in case of FIG. 7, the width of the falling pulses of the pulse power supply, (T/2), is set sufficiently longer than the time constant of the integral circuit so as to cause the transient response voltage to reach 0 volt at time T/2, whereas in case of FIG. 8, the width of the falling pulses, (T1), is set so short as to cause the transient response voltage not to reach 0 volts at time $T_1$.

It is also noted that in both cases of FIG. 7 and 8, the width of the rising pulses is set sufficiently longer than the time constant of the integral circuit so as to cause the transient response voltage to reach the peak value $V_I$ at time T or $T_2$.

If the target on which the displacement detector 10 is mounted is displaced, in turn displacing the core 13 of the displacement sensor 11 shown in FIG. 4 by X1 toward the detecting coil 12A side, which causes the inductance L (the inductance in case of the core 13 being at the neutral position) of the detecting coil 12A, for example, to decrease to L1 and the inductance L of the detecting coil 12B to increase to L2, then because of the relationship that L1<L2, the time constant $(L1/R_F)$ in the transient response voltage $V_{S1}$ across the terminals S1 and S2 becomes less than that $(L2/R_F)$ in the transient response voltage $V_{S2}$, so that the pulse voltages in the transient response voltage $V_{S1}$ rises and falls faster than those in the transient response voltage $V_{S2}$ in FIG. 7 and 8.

If the core 13 has been subjected to a displacement of the X1 direction, the detection voltage $V_D$ $(=V_{S1}-V_{S2})$ across the detection terminals S1 and S2 is detected as having the minus polarity during falling pulses and the plus polarity during rising pulses.

If the core 13 of the displacement sensor 11 shown in FIG. 4 has been subjected to a displacement of the X2 direction, the detection voltage $V_D$ $(=V_{S1}-V_{S2})$, which has the opposite relation to the foregoing, is detected as having the plus polarity during falling pulses and the minus polarity during rising pulses.

Thus, the absolute value of the detected voltage $V_D$ $(=V_{S1}-V_{S2})$ determines the amount of the displacement X1 or X2, and the sign of the detected voltage $V_D$ determines the direction of the displacement.

If the arrangement is such that the detected voltage $V_D$ is detected during a falling pulse in FIG. 7 and 8, then the maximum detected voltage $V_D$ $(=V_{DMAX-}$. This sign is minus.) can be detected at time $t_M$ in FIG. 7 and the detected voltage $V_D$ can be detected at time $T_1$ in FIG. 8.

The arrangement may be such that in FIG. 8, the same detected voltage $V_D$ $(=V_{DMAX-})$ as in FIG. 7 can be detected by setting $T_1$ to $t_M$.

Also, an arrangement may be made so as to detect the detected voltage $V_D$ during a rising pulse in FIG. 7. By doing this, the maximum detected voltage $V_D$ $(=V_{DMAX+})$ with the plus sign can be detected.

As described above, a sensitive displacement detector 10 is constructed by making an arrangement so as to detect the largest possible detected voltage $V_D$ even for the same displaced quantity of the displacement sensor 11.

FIG. 9 is a block diagram showing the overall structure of an exemplary displacement detector according to the present invention, including deviation voltage detecting means.

In FIG. 9, the displacement detector 10 comprises a displacement sensor 11, a pulse power supply 15 and deviation voltage detecting means 16, and is so arranged that the deviation voltage detecting means 16 detects the maximum value of the detected voltages $V_D$, i.e., $V_{DMAX-}$ or $V_{DMAX+}$ on the basis of the detected voltages $V_D$ across the detection terminals S1 and S2 and pulse information $V_I$ (e.g., information on the rising, the falling and the peak value of pulses) from a terminal $P_O$ of the pulse power supply 15 and converts the maximum values into a displaced quantity X corresponding to the detected voltage $V_D$.

FIG. 10 is a block diagram of a primary part structure of a first illustrative embodiment of a deviation voltage detecting means for a displacement detector according to the invention.

In FIG. 10, the deviation voltage detecting means 16 has a microprocessor-based structure, comprises deviation voltage memory means 16A, rising pulse detecting means 16B, timer means 16C, maximum deviation voltage operating means 17 and to-displaced-quantity converting means 16B, and is so arranged that the maximum deviation voltage $V_{DMAX-}$ within a period of a falling pulse of the pulse power supply 15 is calculated on the basis of the detected voltages $V_D$ detected by the displacement sensor 11 to convert the maximum deviation voltage $V_{DMAX-}$ into a displaced quantity for output.

The deviation voltage memory means 16A comprises an A/D converter, differential amplifier, rewritable memory such as RAM and a switching circuit. The deviation voltage memory means 16A takes in detected voltages $V_D$ detected by the displacement sensor 11 a predetermined times during a falling pulse period (a period of T/2 in FIG. 7, or $T_1$ in FIG. 8) of the pulse power supply 15 (with a peak value $V_I$) on the basis of falling information $T_D$ and rising information $T_U$ supplied from the falling pulse detecting means 16B and stores the taken-in detected voltages $V_D$ as digital values.

The taking-in operation for the detected voltage $V_D$ is done at the timing of sampling pulses generated under the control of, e.g., a microprocessor.

Also, in the deviation voltage memory means 16A, the control is such that by means of switching operation of the switching circuit, the detected voltages $V_D$ (with a peak value of $V_I$) is stored in the memory during the falling pulse period of the pulse power supply 15 and not stored during the rising pulse period, and at the same time, detected voltage data $V_{DM}$ of the detected voltage $V_D$ stored in the memory is sequentially output to the maximum deviation voltage operating means 17.

The maximum deviation voltage operating means 17 comprises a comparator, memory for storing the maximum values, and so forth to supply the maximum deviation voltage $V_{DMAX-}$ as the maximum value of the detected voltage data $V_{DM}$ to the to-displaced-quantity converting means 18 by applying comparative operations to detected voltage data $V_{DM}$ sequentially supplied from the deviation voltage memory means 16A to store the larger detected voltage data $V_{DM}$.

The rising pulse detecting means 16B detects the rising and the falling (for example, edges) to output rising information $T_D$ and falling information $T_U$ to the deviation voltage memory means 16A and the timer means 16C.

The timer means 16C begins timing in response to the falling information $T_D$ and stops timing in response to the rising information $T_U$ to supply a timer signal $T_K$ obtained through the timing operation to the to-displaced-quantity converting means 18.

The to-displaced-quantity converting means 18 is provided with memory such as ROM to store, in advance, maximum deviation voltages $V_{DMAX-}$ preset on the basis of theoretical values (calculated values) or experimental values and corresponding displaced quantities and to output displaced quantity signal X corresponding to the maximum deviation voltage $V_{DMAX-}$ supplied from the maximum deviation voltage operating means 17.

Further, in order to detect the sign of the maximum deviation voltage $V_{DMAX-}$, an arrangement is so made that the falling pulse period $T_{DO}$ of the pulse power supply 15 used by the to-displaced-quantity converting means 18 is stored beforehand in rewritable memory such as RAM, and if a timer signal $T_K$ supplied from the timer means 16C is equal to the stored falling pulse period $T_{DO}$, then the displaced quantity signal X is supplemented with information indicative of the minus sign for outputting.

However, in this case the falling and rising pulse periods in FIG. 7 are set to different values to discriminate the falling and rising pulse periods of the pulse power supply 15.

Also, in another arrangement, the detected voltage data $V_{DM}$ may include digital information on the sign as well as the magnitude (voltage) so as to output a displaced quantity signal X including digital information indicative of the sign.

Alternatively, in a deviation voltage detecting means 16 which corresponds to FIG. 8, the maximum deviation voltage operating means 17 and the timer means have been eliminated, and then the deviation voltage memory means 16A stores only the deviation voltage $V_D$ which is to be stored as the maximum deviation voltage $V_{DMAX-}$ on the basis of rising information supplied from the falling pulse detecting means 16B to send detected voltage data $V_{DM}$ directly to the to-displaced-quantity converting means 18, which outputs a displaced quantity X stored in advance in ROM of the to-displaced-quantity converting means 18 and corresponding to the detected voltage data $V_{DM}$.

As described above, deviation voltage detecting means 16 of an inventive displacement detector stores detected voltage $V_D$ detected by a displacement sensor 11 during a falling pulse period of a pulse power supply 15, detects the maximum value based on the stored detected voltages $V_D$ as a maximum deviation voltage $V_{DMAX-}$ and outputs a displacement signal X, with a sign, which corresponds to the maximum deviation voltage $V_{DMAX-}$, so that it is possible to detect the mount of displacement and at the same time detect the direction of the displacement.

Figure 11:
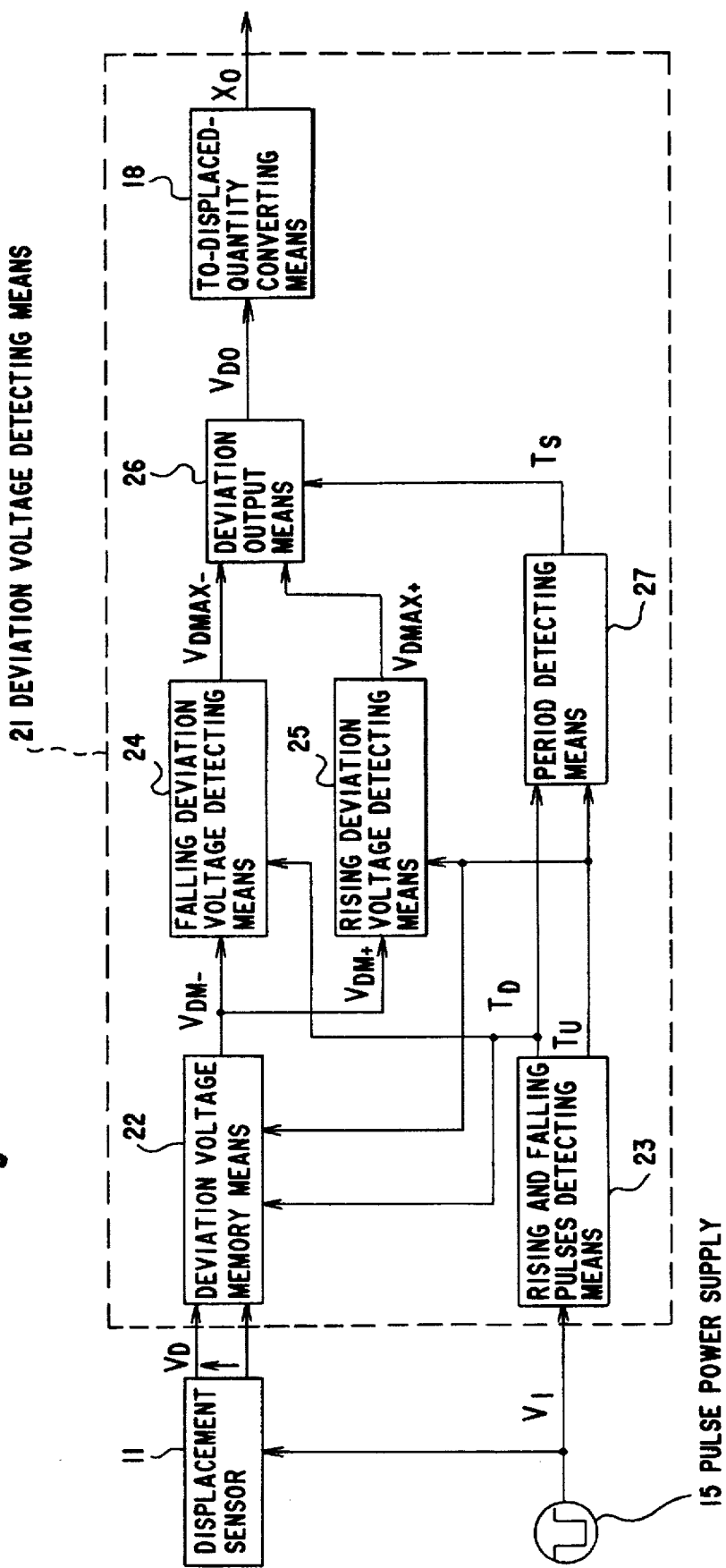
FIG. 11 is a block diagram of a primary part structure of a second illustrative embodiment of a deviation voltage detecting means for a displacement detector according to the invention.

FIG. 11 is a block diagram of a primary part structure of a second illustrative embodiment of a deviation voltage detecting means for a displacement detector according to the invention.

In FIG. 11, the deviation voltage detecting means 21: has a microprocessor-based structure; comprises deviation voltage memory means 22, falling and rising pulses detecting means 23, falling deviation voltage detecting means 24, rising deviation voltage detecting means 25, deviation output means 26, period detecting means 27, and to-displaced-quantity converting means 18; and is so arranged that the maximum deviation voltages $V_{DMAX-}$ and $V_{DMAX+}$ of the detected voltages $V_D$ by the displacement sensor 11 are detected, respectively, within a falling and a rising pulse period of the pulse power supply 15, the deviation of the maximum deviation voltages $V_{DMAX-}$ and $V_{DMAX+}$ are detected as a deviation output $V_{DO}$, and then the deviation output $V_{DO}$ is converted into a displaced quantity signal $X_O$ for outputting.

Like the deviation voltage memory means 16A in FIG. 10, the deviation voltage memory means 22 comprises an A/D converter, differential amplifier, rewritable memory such as RAM and a switching circuit. The deviation voltage memory means 22 takes in detected voltage $V_D$ detected by the displacement sensor 11 a predetermined times during each of a falling pulse period (a period of T/2 in FIG. 7, or $T_1$ in FIG. 8) and a rising pulse period (a period of T/2 through T in FIG. 7) of the pulse power supply 15 (with a peak value $V_I$) on the basis of falling information $T_D$ and rising information $T_U$ supplied from the falling and rising pulses detecting means 23, and stores the detected voltages for the falling and the rising pulse period in memory as digital values, that is, detected voltage data $V_{DM-}$ and $V_{DM+}$, respectively.

The deviation voltage memory means 22 supplies the detected voltage data $V_{DM-}$ and $V_{DM}$ stored in the memory to the falling and the rising deviation voltage detecting means 24 and 25 respectively.

The falling and the rising deviation voltage detecting means 24 and 25 each comprise a comparator, memory for storing the maximum values, etc. Making triggers falling information $T_D$ and rising information $T_U$ supplied from the falling and rising pulses detecting means 23, the means 24 and 25 take in and apply comparative operations to detected voltage data $V_{DM-}$ and $V_{DM-}$ sequentially supplied from the deviation voltage memory means 22 and store larger detected voltages $V_{DM-}$ and $V_{DM-}$ to output the maximum deviation voltage $V_{DMAX-}$ and $V_{DMAX+}$ to the deviation output means 26.

The deviation output means 26 is composed of a comparator comprising an operational amplifier etc. The means 26 calculates the deviation (=$V_{DMAX-}-V_{DMAX+}$) of the maximum deviation voltage $V_{DMAX-}$ and $V_{DMAX+}$ for one pulse period (T) shown in FIG. 7 on the basis of a period signal $T_S$ output from the period detecting means 27 and corresponding to periods of the pulse power supply 15 and supplies a deviation output $V_{DO}$ to the to-displaced-quantity converting means 18.

It should be noted that the maximum deviation voltage $V_{DMAX-}$ and $V_{DMAX+}$ are different in signs, and so if the absolute values of $V_{DMAX-}$ and $V_{DMAX+}$ equal each other, the deviation output $V_{DO}$ can be detected as two times value of the maximum deviation voltage $V_{DMAX-}$ or $V_{DMAX+}$.

The to-displaced-quantity converting means 18, which has the same structure as that of FIG. 10, stores deviation outputs $V_{DO}$ (=$V_{DMAX-}-V_{DMAX+}$) preset in advance on the basis of theoretical values (calculated values) or experimental values and corresponding displaced quantities X and outputs the displaced quantity $X_O$ corresponding to a deviation output $V_{DO}$ supplied from the deviation output means 26.

The period detecting means 27 comprises a timer circuit etc. and is intended for detecting the pulse period T of the pulse power supply 15 on the basis of falling information $T_D$ and rising information $T_U$ supplied from the rising and falling pulses detecting means 23 to output a period signal $T_S$ to the deviation output means 26.

As described above, deviation voltage detecting means 21 of an inventive displacement detector stores detected voltages $V_{DM-}$ and $V_{DM+}$ detected during a falling and a rising pulse period of a pulse power supply 15 by a displacement sensor 11, detects the maximum values of the detected voltages $V_{DM-}$ and $V_{DM+}$ stored during the falling and the rising pulse periods as maximum deviation voltages $V_{DMAX-}$ and $V_{DMAX+}$, respectively, and calculates the deviation between the maximum deviation voltages $V_{DMAX-}$ and $V_{DMAX+}$ for a deviation output to output a displaced quantity signal $X_O$ which corresponds to the deviation output $V_{DO}$, so that it is possible to detect the mount of displacement with a higher sensitivity.

The direction of a displacement is determined according to a sign of the deviation output $V_{DO}$, e.g., determined to be X1 shown in FIG. 4 if the sign is minus, and X2 if it is plus.

Note that while the core of the displacement sensor is formed of nonmagnetic substance in the above illustrative embodiment, it may be formed of magnetic substance.

It is also noted that the above described deviation voltage detecting means converted the deviation (detected voltage $V_D$) of analog transient response voltages detected by the displacement sensor by a A/D converter into a digital value for subsequent processing, the analog transient response voltages may be processed as it is.

Figure 12:
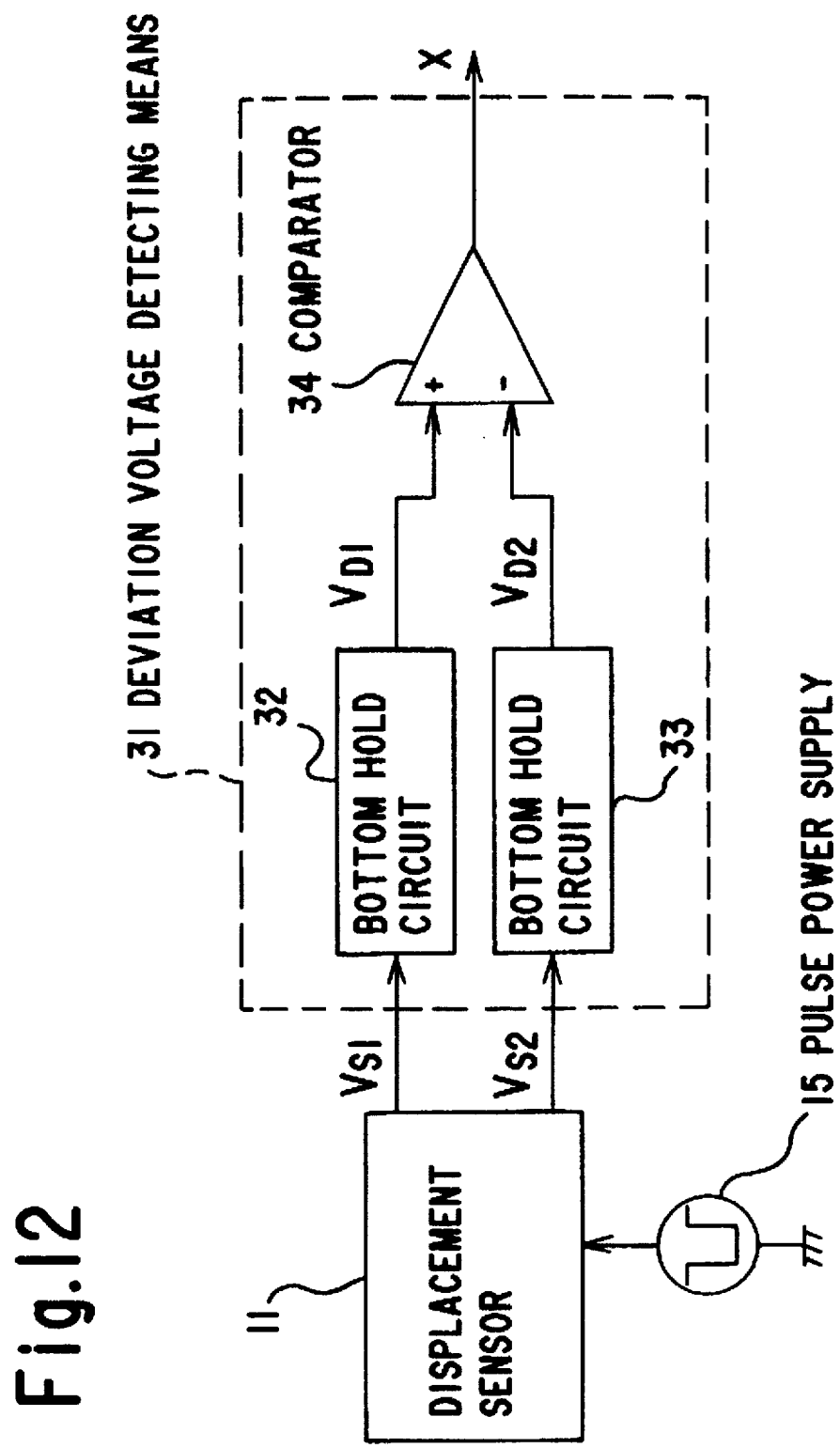
FIG. 12 is a block diagram of an illustrative embodiment of a deviation voltage detecting means comprising an analog circuit.

FIG. 12 is a block diagram of an illustrative embodiment of a deviation voltage detecting means comprising an analog circuit.

In FIG. 12, the deviation voltage detecting means 31 comprises bottom hold circuits 32 and 33 for holding, in analog value, transient response voltages $V_{S1}$ and $V_{S2}$ at time $T_1$ in a falling pulse period, or bottom values, thereof (see FIG. 8), and a comparator 34 for calculating and amplifying the deviation ($V_{D1}-V_{D2}$) between the bottom voltage $V_{D1}$ and $V_{D2}$ from the bottom hold circuits 32 and 33 to output a displaced quantity signal X.

In the deviation voltage detecting means, which is composed of an analog circuit, the amount of displacement is detected from the absolute value of a displaced quantity signal X, and the direction of the displacement is detected depending on a sign of the displaced quantity signal X (whether it is plus or minus).

An example of an application of a displacement detector according to the invention to a torque detector is presented in the following.

FIG. 13 is a block diagram of a primary part structure of a torque detector using a displacement detector according to the invention. FIG. 14 is a diagram showing wave-forms of each functional section in a torque detector.

In FIG. 13, a torque detector 40 is composed of a torque sensor 41 to which a displacement detector is applied and a torque detecting means 46.

The torque sensor 41 comprises an input shaft 42, an output shaft 43, a torsion bar (not shown) connecting the input and the output shaft 42 and 43, and a displacement sensor constituting core 44, coil 45A and 45B and two reference resistors (not shown).

When a torque is applied to the input and the output shaft 42 and 43, this results in a torsion angle ($\theta_T$) in the torsion bar which is proportional to the torque (T).

The torsion angle ($\theta_T$) is converted into a longitudinal displacement ($x_T$) of the core 44 which is caused by the action of pins coupled to both shafts and a spiral and a longitudinal groove (both are not shown) provided on the core 44.

The displacement of the core 44 is detected as a change ($\Delta L_T$) in the inductance of the above mentioned coils 45A and 45B. The change in the inductance, ($\Delta L_T$), is detected as transient response voltages $V_{S1}$ and $V_{S2}$ of a pulse voltage $V_I$ applied to a bridge circuit comprising the coils 45A and 45B and the two reference resistors.

As described above, a torque sensor 41 may be constructed using a displacement sensor for a displacement detector according to the present invention, wherein a torque (T) is converted into a torsion angle ($\theta_T$), which is converted into a displacement ($x_T$) of a core 44, and so the torque is detected in response to the displacement ($x_T$) as a change ($\Delta L_T$) in the inductance of the coils and therefore can be detected as pulse transient response voltages $V_{S1}$ and $V_{S2}$ corresponding to the change ($\Delta L_T$) in the inductance.

The torque detecting means 46 comprises: a pulse generator 51 for supplying a pulse voltage $V_I$ to the torque sensor 41, first order CR low pass filters 47A and 47B for removing harmonic switching noises ($N_S$) from the pulse transient response voltages $V_{S1}$ and $V_{S1}$ detected by the torque sensor 41 to output pulse transient response voltages Va ($V_{S1}$ and $V_{S2}$), bottom hold circuit 48A and 48B for holding and outputting the bottom voltages $V_{T1}$ and $V_{T2}$ of the pulse transient response voltage Va ($V_{S1}$ and $V_{S2}$), a differential amplifier 49 for calculating and amplifying the deviation of the bottom voltages $V_{T1}$ and $V_{T2}$, i.e., $V_{T2}-V_{T1}$ by a gain G1 to provide a deviation voltage Vb, and an inverting amplifier 50 for inverting and shifting the deviation voltage Vb by a reference voltage (for example, to 2.5V) to provide a torque detected voltage $V_T$.

Figure 14A:
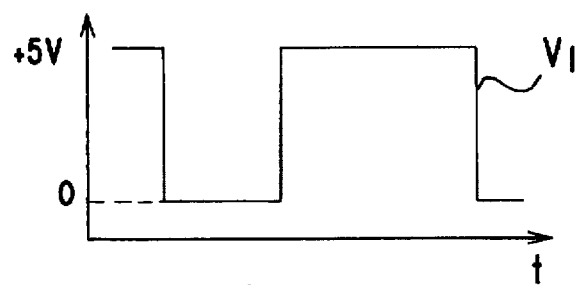
FIG. 14 is a diagram showing a wave-form of each functional section in a torque detector.
Figure 14B:
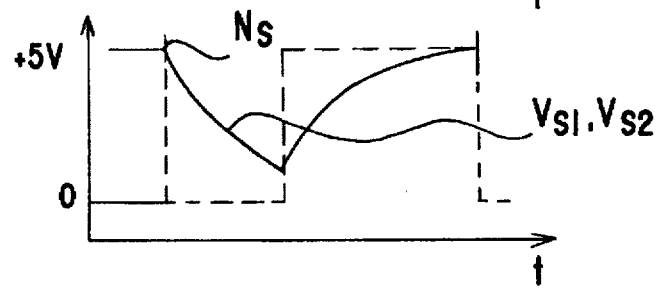
Figure 14C:
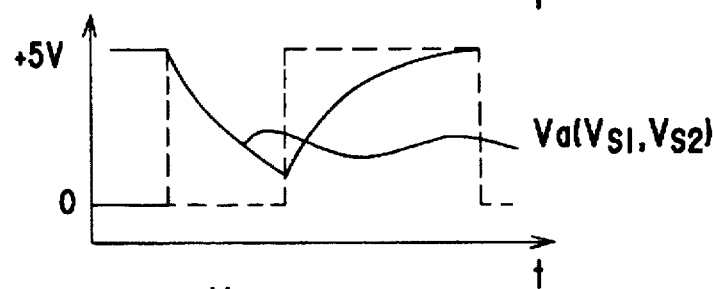
Figure 14D:
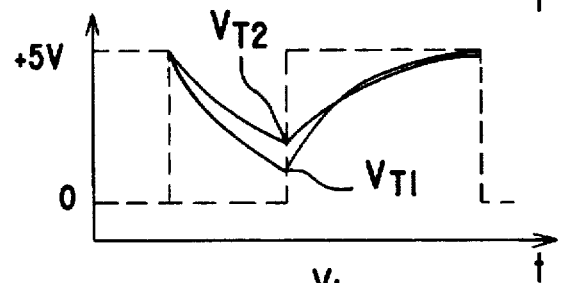
Figure 14E:
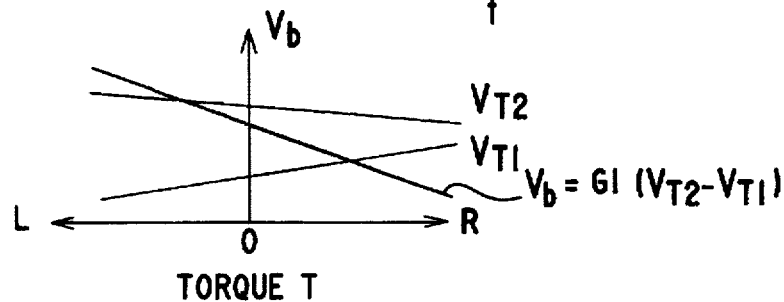
Figure 14F:
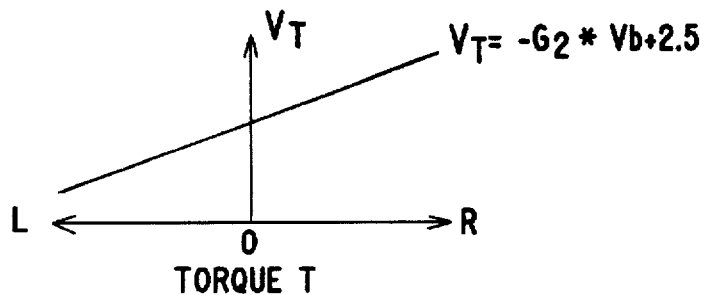

Thus, the torque detecting means 46 is so arranged that a value corresponding to the torque (T) (the magnitude and the direction) applied to the torque sensor 41 is detected as the absolute value of the torque detected voltage $V_T$ and the absolute is set so as to be represented by, for example, such a line as the torque detected voltage $V_T$ decreases with a torque application in the left direction and increases with a torque application in the right direction as shown in FIG. 14(f).

Therefore, once a conversion table of torques (T) and corresponding torque detection voltage $V_T$ which was found by calculation or experiment is stored beforehand in memory such as ROM, the torque (T) applied to the torque sensor 41 can be detected on the basis of a torque detection voltage $V_T$ (absolute value) detected by the torque detecting means 46.

In the wave-forms at functional components shown in FIG. 14, FIG. 14(a) is a pulse voltage $V_I$ output wave-form, FIG. 14(b) is pulse transient response voltage $V_{S1}$ and $V_{S2}$ detected in the bridge circuit in the torque sensor 41 in which switching noises $N_S$ of a output circuit 51B, e.g., a switching transistor, of the pulse generating circuit 51 is included at falling and rising edges of the pulse voltage $V_I$.

FIG. 14(c) is a wave-form of a pulse transient response voltage Va ($V_{S1}$ or $V_{S2}$) which has passed through the low pass filter 47A or 47B to have had its switching noises $N_S$ removed.

FIG. 14(d) shows wave-forms of bottom voltages $V_{T1}$ and $V_{T2}$, and FIG. 14(e) is a wave-form of a deviation voltage Vb which is an amplified-by-G1 version of the deviation $V_{T2}-V_{T1}$ of the bottom voltages $V_{T2}$ and $V_{T1}$.

FIG. 14(f) shows a wave-form of a torque detection voltage $V_T$ provided by inverting and shifting the deviation voltage Vb by a reference voltage (for example, 2.5V). The torque detection voltage $V_T$ equals the reference voltage (2.5V) at a torque (T) of zero and varies linearly in response to the magnitude and the direction of the torque (t).

Note that the torque detecting means 46 is constructed using analog circuit in the above embodiment, while it may be constructed using digital circuit.

By using a microprocessor, processing such as calculation, decision, etc. may be coped with by software.

An illustrative embodiment of a steering torque sensor for an electric powered steering system to which an inventive displacement detector is applied will be presented in the following.

Figure 15:
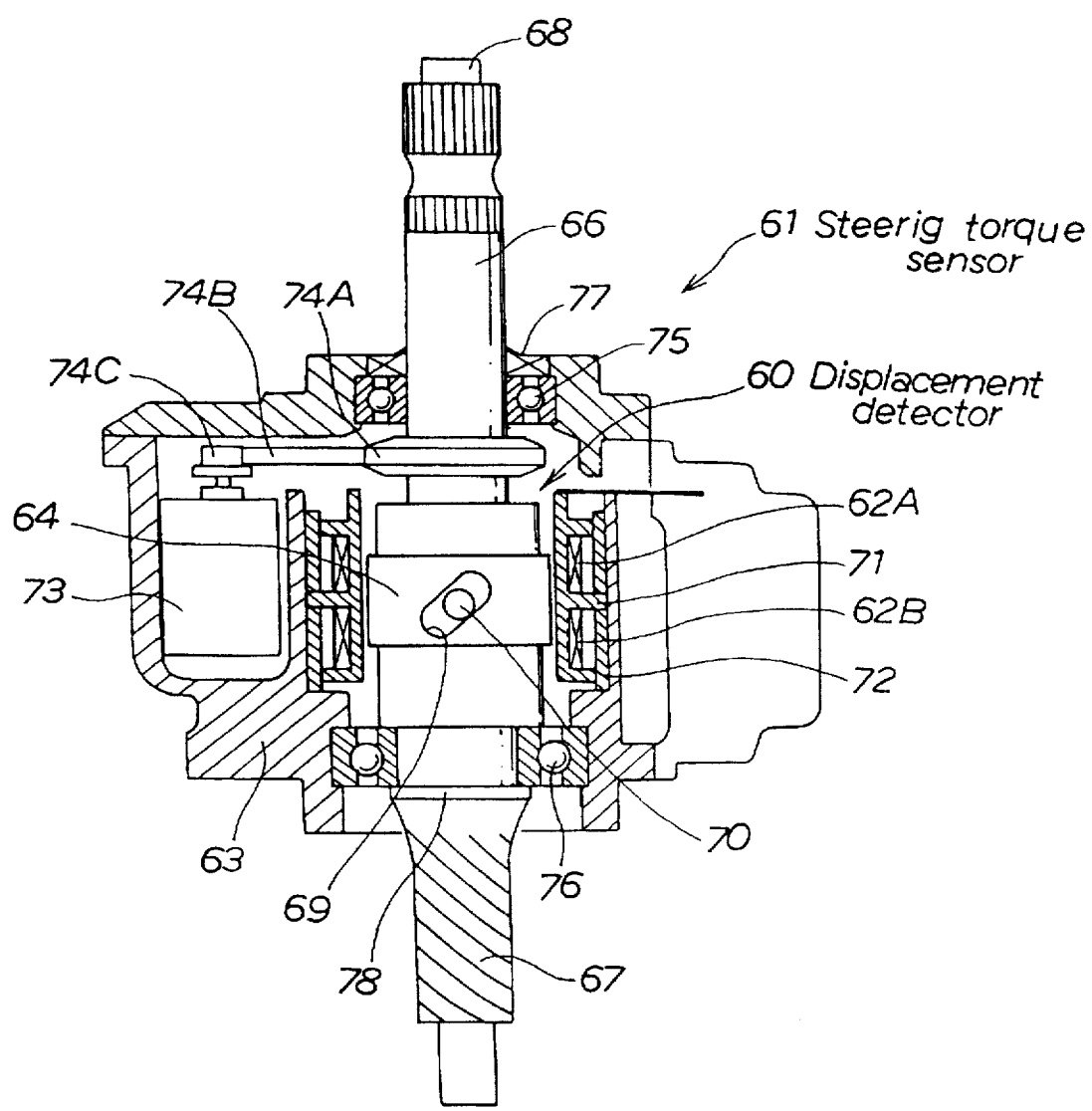
FIG. 15 is a sectional view of an exemplary steering torque sensor according to the invention.

FIG. 15 is a sectional view of an exemplary steering torque sensor according to the invention.

As shown in FIG. 15, the steering torque sensor 61 comprises two detecting coils 62A and 62B, a housing supporting the detecting coils 62A and 62B, and a core 64 for providing a magnetic change for the detecting coils 62A and 62B.

Figure 19:
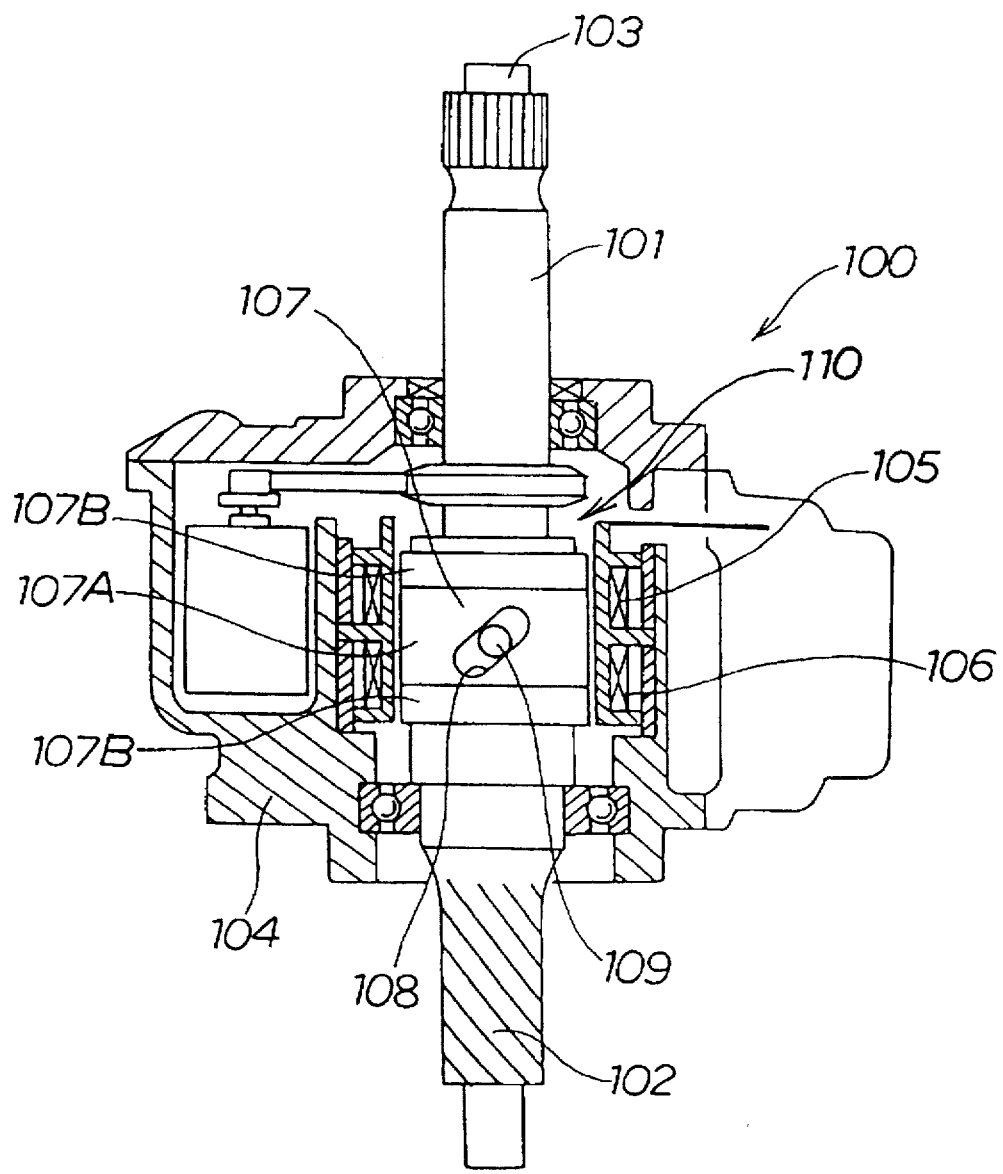
FIG. 19 is a diagram showing a structure of a conventional steering torque sensor.

It should be noted that the core 64 is monolithically constructed by making nonmagnetic metal material or aluminum material (A1 material) cylindrical, and aluminum rings 107B called "leak cut rings" may be omitted which is attached to both cylindrical ends of the core 107A formed of conventional cylindrical magnetic material (SCM material) as shown in FIG. 19.

Also, in the steering torque sensor 61, an input shaft 66 and an output shaft 67 are linked via a torsion bar 68 within the inside.

The core 64 is only movable in the directions of the input shaft 66 and the output shaft 67 by a longitudinal guide groove of the output shaft 67 engaging with an inward projection of the core 64. With a spiral groove 69 of the core 64 there is engaging a slider pin 70 pressed in the input shaft 66.

A housing 63, which is formed of aluminum material (A1 material), is so arranged as to support a coil bobbin 71 via a yoke 72 and enclose the core 64, the input shaft 66 and output shaft 67.

Further, within the housing 63, there is provided a tachometer 73 for detecting the speed of revolution of the input shaft 66 via a gear 74A, a toothed belt 74B and a gear 74C. There are also provided bearings 75 disposed between the input shaft 66 and the housing 63, bearings 76 disposed between the output shaft 67 and the housing 63, a dust seal 77 and a caulking ring 78, etc.

It is also noted that the steering torque sensor 61 has two built-in reference resistors $R_F$ as shown in FIG. 4 and 5, which are connected to the detecting coils 62A and 62B to form a bridge circuit, which, in turn, is connected to the torque detecting means 46 as shown in FIG. 13.

Operation of the steering torque sensor 61 will be explained in the following.

When a torsion torque is applied to the input shaft 66 of the steering torque sensor 61 by the driver handling the steering wheel, the torsion bar 68 is elastically distorted causing a relative displacement in the rotational direction between the input shaft 66 and the output shaft 67.

When a relative displacement occurs, the core 4 disposed around the input shaft 66 and the output shaft 67 is displaced in the longitudinal direction with respective to the input and output shaft 66 and 67 by a longitudinal guide groove of the output shaft 67 engaging with an inward projection of the core 64 and a slider pin 70 pressed in the input shaft 66 engaging with a spiral groove 69 of the core 64.

If core 64 moves in the longitudinal direction, the magnetic flux around the coils 62A and 62B changes, causing the inductances L1 and L2 of the detecting coils 62A and 62B to increase and decrease, respectively.

FIG. 16 is a diagram illustrating operation of an exemplary steering torque sensor according to the present invention.

Figure 16A:
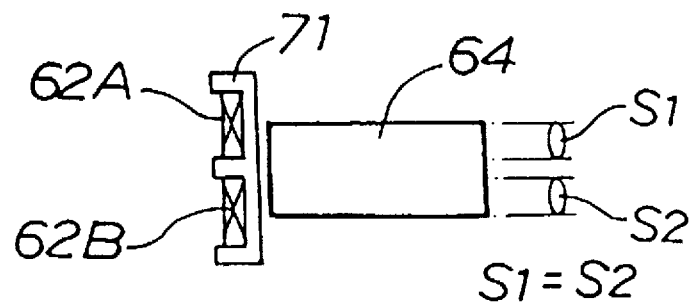
FIG. 16 is a diagram illustrating operation of an exemplary steering torque sensor according to the invention.

FIG. 16(a) shows a state in which any steering torque is not applied to the steering torque sensor 61. In this case, the core 64 is positioned at the central position between the detecting coils 62A and 62B, (i.e., the neutral position), that is, the area S1 in which the detecting coil 62A encircles the core 64 and the area S2 in which the detecting coil 62B encircles the core 64 is equal (S1=S2).

In this state, the magnetic losses to the detecting coils 62A and 62B which is caused by the core 64 is equal to each other, and accordingly the inductance L1 of the detecting coil 62A and the inductance L2 of the detecting coil 62B equals each other (L1=L2).

Figure 16B:
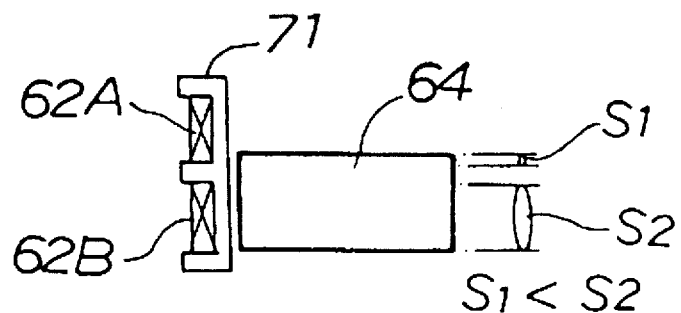
Figure 17:
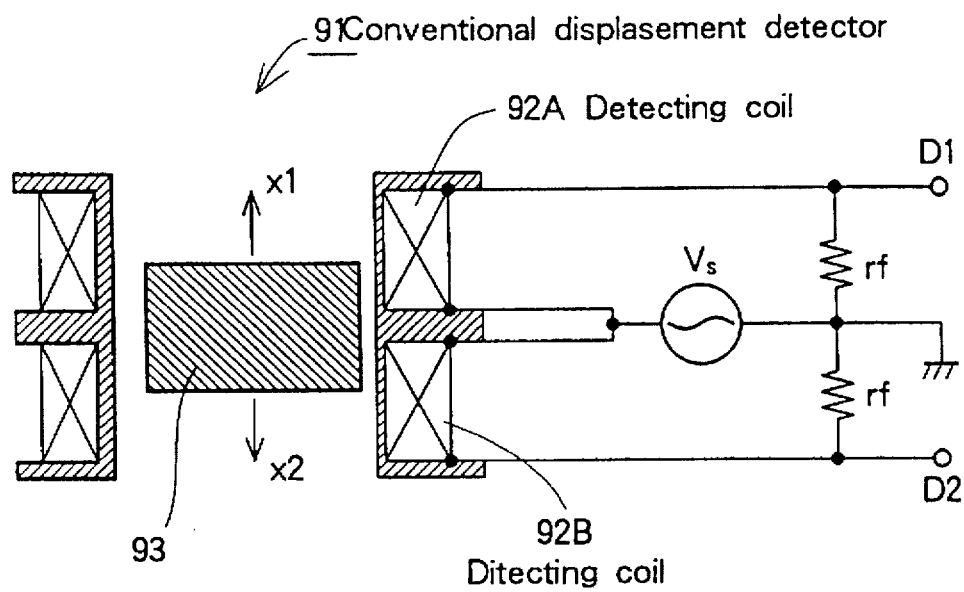
FIG. 17 is a block diagram of a primary part structure of a conventional displacement detector.
Figure 18:
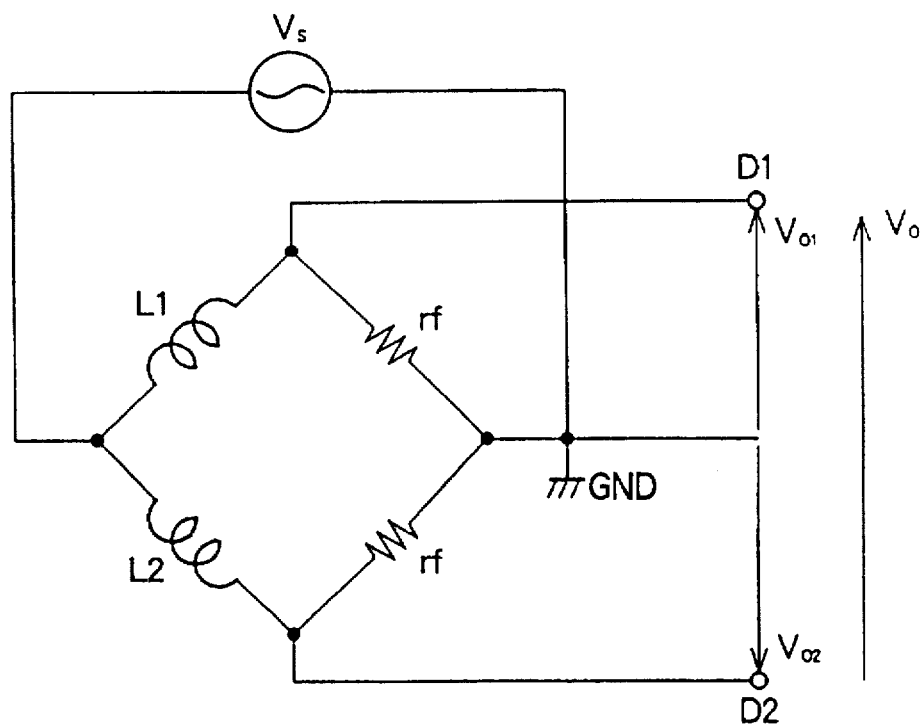
FIG. 18 is an equivalent circuit diagram of the conventional displacement detector.

FIG. 16(b) shows the state in which a steering torque is being applied to the steering torque sensor 61. In this case, the core 64 has been displaced toward the detecting coil 62B, which causes the area S1 in which the coil 62A encloses the core 64 to decrease, that is, the magnetic loss to the coil 62A decreases, and eventually the inductance L1 of the coil 62A increases.

On the other hand, the area S2 in which the detecting coil 62B encircles the core 64 increases causing the magnetic loss to the coil 62B to increase, and accordingly the inductance L2 of the coil 62B decreases.

Thus, If the core 64 is displaced toward the detecting coil 62B, the inductance L1 of the coil 62A is larger than the inductance L2 of the coil 62B, that is, L1>L2.

On the contrary, if the core 64 is displaced toward the detecting coil 62A, the inductance L2 of the coil 62B is larger than the inductance L1 of the coil 62A, that is, L1<L2.

Therefore, the steering torque can be detected as a steering torque quantity including the magnitude and the direction by detecting changes in the inductances L1 and L2 of the detecting coils 62A and 62B which corresponds to the steering torque as torque transient response voltages using, for example, a torque detecting means as shown in FIG. 13.

As detailed above in conjunction with illustrative embodiments, the invention comprises a displaceable core, a detecting coil the inductance of which varies in response to a displaced quantity of the core and a reference resistor, and enables a precise detection of a displaced quantity of the core by detecting a transient response voltage in case of a pulse voltage being applied to the inductance and the reference resistor to enable detection of the absolute value of the inductance and thereby detecting the change in the inductance which corresponds to the displaced quantity, independently of the peak value or the frequency of the pulse voltage.

Also, the invention comprises a displaceable core, two detecting coils the inductances of which vary in response to a displaced quantity, two reference resistors and deviation voltage detecting means, the two detecting coils and the two reference resistors forming a bridge circuit, wherein: a pulse power supply is applied to the bridge circuit to detect a transient response voltage output from the bridge circuit; and a differential changes in the inductances, corresponding to a displaced quantity of the core is detected by detecting a deviation voltage of the transient response voltage by means of the deviation voltage detecting means, so that the displaced quantity of the core can be detected with a high precision.

Further, the invention comprises deviation voltage detecting means comprising maximum deviation voltage operating means for detecting the maximum value of a deviation of the transient response voltage and to-displaced-quantity converting means for converting the maximum deviation voltage from the maximum deviation voltage operating means into a displaced quantity, wherein the displaced quantity of the core can be detected with a high precision because a displacement length is detected as a large voltage.

Still further, the invention comprises deviation voltage detecting means comprising falling maximum deviation voltage detecting means, rising maximum deviation voltage detecting means, deviation output means and to-displaced-quantity converting means, wherein: the maximum value of deviations between the two path transient response voltages during each pulse period of a falling and a rising pulse is detected; the deviation of the maximum value for each pulse period is detected and converted into a displaced quantity; the displaced quantity is detected as a larger voltage, so that the displaced quantity of the core can be detected with a high precision.

Also, the invention simplifies the structure because the core of the displacement detector is formed of a single component of nonmagnetic metal material and which can precisely detect a displaced quantity of the steering torque.

Furthermore, the invention can reduce a variation in the characteristic of the sensor, involved in machining when a magnetic metal material is formed into the core because the core of the displacement detector is formed of a single component of nonmagnetic metal material.

Therefore, according to the present invention, there is provided a displacement detector which detects the displaced quantity sensitively and precisely.

Furthermore, there is provided a steering torque sensor for an electric powered steering system, which is simply structured and yet enables a sensitive detection of the displaced quantity caused by a steering torque.

Many widely different embodiments of the present invention may be constructed without departing from the spirit and scope of the present invention. It should be understand that the present invention is not limited to the specific embodiments described in the specification, except as defined in the appended claims.

What is claimed is:

1. A displacement detector comprising:
   a core displaceable in the longitudinal direction from a neutral position;
   two detecting coils arranged symmetrically on opposite sides of said neutral position along an axis of the longitudinal displacement of said core, the inductances of said detecting coils varying differentially in response to a displacement of said core;
   two reference resistors, each connected in series to one of said two detecting coils;
   a bridge circuit composed of said two reference resistors and said two detecting coils;
   a pulse power supply applied to said bridge circuit;
   deviation voltage detecting means for detecting the deviation voltage between the respective transient response voltages across said two reference resistors in said bridge circuit,
   wherein the quantity and the direction of said displacement of said core are detected on the basis of said deviation voltage,
   wherein said deviation voltage detecting means detects the maximum value of detected voltages from said bridge circuit on the basis of said detected voltages and pulse information from said pulse power supply,
   wherein one of the rising pulse period and the falling pulse period is set greater than the time constant of integral circuits in said bridge circuit, and
   wherein said displacement detector further comprises:
      deviation voltage memory means for storing said detected voltage at each sampling time and supplying said stored detected voltages;
      maximum deviation voltage operating means for applying a comparative operation to each of said stored detected voltages to output a maximum deviation voltage; and
      to-displaced-quantity-quantity converting means for converting said maximum deviation voltage into a displaced quantity.

2. A displacement detector comprising:
   a core displaceable in the longitudinal direction from a neutral position;
   two detecting coils arranged symmetrically on opposite sides of said neutral position along an axis of the longitudinal displacement of said core, the inductances of said detecting coils varying differentially in response to a displacement of said core;
   two reference resistors, each connected in series to one of said two detecting coils;
   a bridge circuit composed of said two reference resistors and said two detecting coils;
   a pulse power supply applied to said bridge circuit;
   deviation voltage detecting means for detecting the deviation voltage between the respective transient response voltages across said two reference resistors in said bridge circuit,
   wherein the quantity and the direction of said displacement of said core are detected on the basis of said deviation voltage,
   wherein said deviation voltage detecting means detects the maximum value of detected voltages from said bridge circuit on the basis of said detected voltages and pulse information from said pulse power supply,
   wherein one of the rising pulse period and the falling pulse period is set greater than the time constant of integral circuits in said bridge circuit, the other one of said rising pulse period and said falling pulse period is set less than said time constant of said integral circuits in said bridge circuit, and
   wherein said displacement detector further comprises:
      deviation voltage memory means for storing the maximum deviation voltage of said detected voltages at each sampling time for output; and to-displaced-quantity-quantity converting means for converting said maximum deviation voltage of said detected voltages, which is output from said deviation voltage memory means into a corresponding displaced quantity.

3. A displacement detector comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit; and deviation voltage detecting means for detecting the deviation voltage between the respective transient response voltages across said two reference resistors in said bridge circuit, wherein the quantity and the direction of said displacement of said core are detected on the basis of said deviation voltage; and wherein said deviation voltage detecting means comprises:

falling maximum deviation voltage detecting means for detecting the maximum value of the deviations between the respective falling pulse transient response voltages across said two reference resistors;

rising maximum deviation voltage detecting means for detecting the maximum value of the deviations between the respective rising pulse transient response voltages across said two reference resistors;

deviation output means for outputting a maximum value deviation of the output from said falling maximum deviation voltage detecting means and the output from said rising maximum deviation voltage detecting means; and to-displaced-quantity-quantity converting means for converting said maximum value deviation into a displaced quantity.

4. A displacement detector comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit; and deviation voltage detecting means for detecting the deviation voltage between the respective transient response voltages across said two reference resistors in said bridge circuit, wherein the quantity and the direction of said displacement of said core are detected on the basis of said deviation voltage, and wherein said deviation voltage detecting means comprises:

bottom hold circuits for holding the minimum values of said respective transient response voltages across said two reference resistors in said bridge circuit and for providing bottom voltages; and a comparing circuit for calculating and converting the deviation of said bottom voltages into a displaced quantity.

5. A torque sensor comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit;

deviation voltage detecting means for detecting the deviation voltage between the respective transient response voltages across said two reference resistors in said bridge circuit;

an input shaft;

an output shaft; and a torsion bar for linking said input shaft with said output shaft, wherein said core engages with said input and output shaft so as to be displaceable in the longitudinal direction from the neutral position in response to a steering torque applied to said input shaft, wherein one of the rising and the falling pulse period is set longer than the time constant of integral circuits in said bridge circuit, and wherein said torque sensor further comprises:

deviation voltage memory means for storing said detected voltage at each sampling time and supplying said stored detected voltages;

maximum deviation voltage operating means for applying a comparative operation to each of said stored detected voltages to output a maximum deviation voltage; and to-displaced-quantity-quantity converting means for converting said maximum deviation voltage into a displaced quantity.

6. A torque sensor comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit; and deviation voltage detecting means for detecting the deviation voltage between the respective transient response voltages across said two reference resistors in said bridge circuit;

an input shaft;

an output shaft; and a torsion bar for linking said input shaft with said output shaft, wherein said core engages with said input and output shaft so as to be displaceable in the longitudinal direction from the neutral position in response to a steering torque applied to said input shaft, wherein one of the rising and the falling pulse period is set longer than the time constant of integral circuits in said bridge circuit, the other one of said rising and said falling pulse period is set shorter than said time constant of said integral circuits in said bridge circuit, and wherein said torque sensor further comprises:

deviation voltage memory means for storing said detected voltage at each sampling time for outputting said detected voltages;

maximum deviation voltage operating means for applying comparative operations to said detected voltages output from said deviation voltage memory means to output the maximum deviation voltage; and to-displaced-quantity-quantity converting means for converting said maximum deviation voltage output from said maximum deviation voltage operating means into a corresponding displaced quantity.

7. A torque sensor comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit; and deviation voltage detecting means for detecting the deviation voltage between the respective transient response voltages across said two reference resistors in said bridge circuit;

an input shaft;

an output shaft; and a torsion bar for linking said input shaft with said output shaft, wherein said core engages with said input and output shaft so as to be displaceable in the longitudinal direction from the neutral position in response to a steering torque applied to said input shaft, and wherein said deviation voltage detecting means comprises:

falling maximum deviation voltage detecting means for detecting the maximum value of the deviations between the respective falling pulse transient response voltages across said two reference resistors;

rising maximum deviation voltage detecting means for detecting the maximum value of the deviations between the respective rising pulse transient response voltages across said two reference resistors;

deviation output means for outputting a maximum value deviation of the output from said falling maximum deviation voltage detecting means and the output from said rising maximum deviation voltage detecting means; and to-displaced-quantity-quantity converting means for converting said maximum value deviation into a displaced quantity.

8. A torque sensor comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit; and deviation voltage detecting means for detecting the deviation voltage between the respective transient response voltages across said two reference resistors in said bridge circuit;

an input shaft;

an output shaft; and a torsion bar for linking said input shaft with said output shaft, wherein said core engages with said input and output shaft so as to be displaceable in the longitudinal direction from the neutral position in response to a steering torque applied to said input shaft, and wherein said deviation voltage detecting means comprises:

bottom hold circuits for holding the minimum values of said respective transient response voltages across said two reference resistors in said bridge circuit and for providing bottom voltages; and a comparing circuit for calculating and converting the deviation of said bottom voltages into a displaced quantity.

9. The torque sensor according to claim 8 wherein:

a low pass filter is provided between said bridge circuit and each of said two bottom hold circuits.

10. The torque sensor according to claim 8 wherein said comparing circuit comprises:

a differential amplifying circuit for differentially amplifying output from said two bottom hold circuits; and an inverting amplifier for inverting the output from said differential amplifying circuit into a positive voltage.

11. A steering torque sensor comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit;

deviation voltage detecting means for detecting the deviation voltage between the respective transient response voltages across said two reference resistors in said bridge circuit;

an input shaft;

an output shaft; and a torsion bar for linking said input shaft with said output shaft, wherein said core engages with said input and output shaft so as to be displaceable in the longitudinal direction from the neutral position in response to a steering torque applied to said input shaft, wherein said input shaft is connected to a steering wheel and said output shaft is connected to steered wheels, wherein one of the rising and the falling pulse period is set longer than the time constant of integral circuits in said bridge circuit, the other one of said rising and said falling pulse period is set shorter than said time constant of said integral circuits in said bridge circuit, and wherein said steering torque sensor further comprises:
 deviation voltage memory means for storing said detected voltage at each sampling time for outputting said detected voltages;
 maximum deviation voltage operating means for applying comparative operations to said detected voltages output from said deviation voltage memory means to output the maximum deviation voltage; and
 to-displaced-quantity-quantity converting means for converting said maximum deviation voltage output from said maximum deviation voltage operating means into a corresponding displaced quantity.

12. A steering torque sensor comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit;

deviation voltage detecting means for detecting the deviation voltage between the respective transient response voltages across said two reference resistors in said bridge circuit;

an input shaft;

an output shaft; and a torsion bar for linking said input shaft with said output shaft;

wherein said core engages with said input and output shaft so as to be displaceable in the longitudinal direction from the neutral position in response to a steering torque applied to said input shaft, wherein said input shaft is connected to a steering wheel and said output shaft is connected to steered wheels, wherein one of the rising and the falling pulse period is set longer than the time constant of integral circuits in said bridge circuit, the other one of said rising and said falling pulse period is set shorter than said time constant of said integral circuits in said bridge circuit, and wherein said steering torque sensor further comprises:
 deviation voltage memory means for storing said detected voltage at each sampling time for outputting said detected voltages;
 maximum deviation voltage operating means for applying comparative operations to said detected voltages output from said deviation voltage memory means to output the maximum deviation voltage; and
 to-displaced-quantity-quantity converting means for converting said maximum deviation voltage output from said maximum deviation voltage operating means into a corresponding displaced quantity.

13. A steering torque sensor comprising:

a core displaceable in the longitudinal direction from a neutral position; two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit;

deviation voltage detecting means for detecting the deviation voltage between the respective transient response voltages across said two reference resistors in said bridge circuit;

an input shaft;

an output shaft; and a torsion bar for linking said input shaft with said output shaft, wherein said core engages with said input and output shaft so as to be displaceable in the longitudinal direction from the neutral position in response to a steering torque applied to said input shaft, wherein said input shaft is connected to a steering wheel and said output shaft is connected to steered wheels, and wherein said deviation voltage detecting means further comprises:

falling maximum deviation voltage detecting means for detecting the maximum value of the deviations between the respective falling pulse transient response voltages across said two reference resistors;

rising maximum deviation voltage detecting means for detecting the maximum value of the deviations between the respective rising pulse transient response voltages across said two reference resistors;

deviation output means for outputting a maximum value deviation of the output from said falling maximum deviation voltage detecting means and the output from said rising maximum deviation voltage detecting means; and to-displaced-quantity-quantity converting means for converting said maximum value deviation into a displaced quantity.

14. A steering torque sensor comprising:

a core displaceable in the longitudinal direction from a neutral position;

two detecting coils arranged symmetrically on opposite sides of said neutral position along an axis of the longitudinal displacement of said core, the inductances of said detecting coils varying differentially in response to a displacement of said core;

two reference resistors, each connected in series to one of said two detecting coils;

a bridge circuit composed of said two reference resistors and said two detecting coils;

a pulse power supply applied to said bridge circuit;

deviation voltage detecting means for detecting the deviation voltage between the respective transient response voltages across said two reference resistors in said bridge circuit;

an input shaft;

an output shaft; and a torsion bar for linking said input shaft with said output shaft, wherein said core engages with said input and output shaft so as to be displaceable in the longitudinal direction from the neutral position in response to a steering torque applied to said input shaft, wherein said input shaft is connected to a steering wheel and said output shaft is connected to steered wheels, and wherein said deviation voltage detecting means further comprises:

bottom hold circuits for holding the minimum values of said respective transient response voltages across said two reference resistors in said bridge circuit and for providing bottom voltages; and a comparing circuit for calculating and converting the deviation of said bottom voltages into a displaced quantity.

15. The steering torque sensor according to claim 14 wherein:

a low pass filter is provided between said bridge circuit and each of said two bottom hold circuits.

16. The steering torque sensor according to claim 14 wherein said comparing circuit comprises:

a differential amplifying circuit for differentially amplifying output from said two bottom hold circuits; and an inverting amplifier for inverting the output from said differential amplifying circuit into a positive voltage.

* * * * *